United States Patent [19]

Boyd et al.

[11] Patent Number: 5,253,103
[45] Date of Patent: Oct. 12, 1993

[54] NONLINEAR OPTICS UTILIZING COMPOSITE OPTICAL MATERIAL ARCHITECTURES FOR PROVIDING ENHANCED NONLINEAR SUSCEPTIBILITY

[75] Inventors: Robert W. Boyd, Rochester, N.Y.; John E. Sipe, Toronto, Canada

[73] Assignee: The University of Rochester, Rochester, N.Y.

[21] Appl. No.: 827,675

[22] Filed: Jan. 29, 1992

[51] Int. Cl.$^5$ .............................................. G02F 1/37
[52] U.S. Cl. .................................. 359/329; 359/326; 359/328
[58] Field of Search ............... 359/326, 328, 329, 330; 372/21

[56] References Cited

U.S. PATENT DOCUMENTS

| | | | |
|---|---|---|---|
| 4,240,048 | 12/1980 | Zumsteg | 332/7.51 |
| 4,448,485 | 5/1984 | Bergman et al. | 350/162.2 |
| 4,624,872 | 11/1986 | Steutz | 428/1 |
| 4,714,838 | 12/1987 | Harelstad et al. | 359/326 |
| 4,756,598 | 7/1988 | Gerbi et al. | 350/96.29 |
| 4,759,820 | 7/1988 | Calvert et al. | 156/600 |
| 4,761,059 | 8/1988 | Yeh et al. | 350/354 |
| 4,839,536 | 6/1989 | Etter et al. | 359/326 |
| 4,929,392 | 5/1990 | Trend | 252/582 |
| 4,943,145 | 7/1990 | Miyata | 350/354 |

OTHER PUBLICATIONS

Corning, Product Information, "Vycor ® Brand Porous Glass", Materials Business, Corning Glass Works, Corning, New York 14831, PI-VPG-88 pp. 1-2, (1991).
D. Ricard, P. Roussignol, and C. Flytzanis, Opt. Lett. 10, 511-513 (Oct. 1985).
F. Hache, D. Ricard and C. Flytzanis, J. Opt. Soc. Am. B 3, 1647-1655, (Dec. 1986).
K. C. Rustagi and C. Flytzanis, Opt. Lett. 9, 344-346 (Aug. 1984).
P. Roussignol, D. Ricard, J. Lakasik, and C. Flytzanis, J. Opt. Soc. Am. B 4, 5-13, (Jan. 1987).
J. C. Maxwell Garnett, Philos. Trans. Roy. Soc. London 203, 384-420 (1904), and 205, 237-283, (1906).
G. S. Agarwal and S. Dutta Gupta, Phys. Rev. A 38, 5678-5698, (Dec. 1988).
J. W. Haus, N. Kalyaniwalla, R. Inguva, M. Bloemer and C. M. Bowden, J. Opt. Soc. Am. B 6, 797-807 (Apr. 1989).
Robert W. Boyd, Nonlinear Optics, Academic Press (Aug. 1992), Sections 1.1 to 1.5 and Sections 10.1 to 10.7.
P. N. Prasad and D. J. Williams, Introduction to Nonlinear Optical Effects in Molecules and Polymers, John Wiley and Sons, (1991), Sections 4.1 to 4.6, 7.4 to 7.5 and 10.1 through 10.7.

Primary Examiner—James W. Davie
Attorney, Agent, or Firm—M. Lukacher

[57] ABSTRACT

Nonlinear optical systems are provided which exhibit an enhanced nonlinear response to applied optical radiation. These systems are useful for processing radiation by nonlinear optical interactions, for example harmonic generation, mixing (sum and difference frequency generation), parametric oscillation, intensity dependent refractive index effects (focusing or lens formation) and perform various photonic functions (electro-optics). The systems utilize a materials system with an architecture in which inclusion components are distributed in a host component (preferably homogeneously). The host component has an optical response which varies nonlinearly with the amplitude of the optical field produced by the radiation applied to the composite material. The inclusion component is preferably particles which are less than a wavelength of the applied radiation in maximum dimension (diameter when the particles are spherical and length of major axis when the particles are generally ellipsoidal). Neighboring particles are also preferably separated by the less than a wavelength. These dimensions and separation of the particles reduce scattering effects. The particles may respond only linearly to the intensity of the radiation, but preferably have a nonlinear response. Even where the particles are nonabsorbing, because of the nonlinear response of the host, the system possesses a nonlinear susceptibility larger than any of its components. Such enhanced susceptibility increases the efficiency of nonlinear optical interactions and improves the performance of nonlinear optical systems such as those mentioned above.

78 Claims, 3 Drawing Sheets

NONLINEAR OPTICS UTILIZING COMPOSITE OPTICAL MATERIAL ARCHITECTURES FOR PROVIDING ENHANCED NONLINEAR SUSCEPTIBILITY

DESCRIPTION

The present invention relates to the field of nonlinear optics and particularly to optical devices, systems and methods of processing optical radiation which rely upon nonlinear optical properties of a body of composite material having two or more components which responds to an applied optical field due to incident optical radiation nonlinearly with the strength of the optical field.

The invention is especially suitable for providing optical systems, devices and optical signal processing methods which rely on the nonlinear response of a material system. The nonlinear response may affect polarization of an optical beam, the amplitude of the beam (in general an optical signal) which is incident upon the material system and which propagates therein. The nonlinear response may change the index of refraction of the material system and produce other nonlinear optical interactions. Interactions and processes, as may be provided by methods and systems embodying the invention include harmonic generation, such as doubling and tripling of the frequency of the incident radiation, mixing of two beams for sum frequency generation and difference frequency generation, optical parametric oscillation, nonlinear or saturable absorption and photonic (including electro-optic effect dependent processes). The term optics or optical as used herein includes light radiation in the visible, the infrared and ultraviolet region. Aspects of the invention may be used in effecting nonlinear processes above the ultraviolet and below the infrared range, for example x-ray radiation. The invention is believed to be primarily of interest in connection with optical radiation in the visible, near infrared and ultraviolet frequency ranges.

The present invention provides improvements in nonlinear optical processing through the use of a body of material (a material system) having an architecture where different materials are combined to form a composite. Preferably the composite is in the solid state, but it may be at least partially in the liquid state and may even be partially in the gaseous state, when the components in the gas are physically stable. There are at least two components, one of which is the host and the other of which provides inclusions in the host. The host is of one material type and the components may differ in their type of material, and significantly in their refractive indices from the index of the host. The inclusions are particles which are dispersed in the host so that the material system is homogeneous on a distance scale of the order of the wavelength of the radiation being processed in the material system. The host and inclusion materials are described by means of their linear or nonlinear responses which depend on the intensity of the radiation propagating in the material system. These responses are more precisely defined by the effect of linear and nonlinear optical susceptibilities of the materials.

It is the principal feature of this invention to provide improved systems, devices and methods for processing of optical radiation, which embody composite material systems presenting nonlinear susceptibility larger than of any component of the composite above. Such increased or enhanced nonlinear susceptibility increases the efficiency of nonlinear optical interactions, thereby improving the performance of systems and processes depending upon such interactions. Moreover, the invention permits enhancement of nonlinear optical properties through the use of materials, both for the host and inclusions in the composite system, which are optically transmissive and do not absorb the radiation which propagates therein, and since the radiation intensity is not depleted by absorption, the processes are carried out more efficiently than where absorbing materials are needed.

Composite material systems have been studied experimentally and theoretically. The pioneer work was that of J. C. Maxwell Garnett, which appeared in *Philos. Trans. Roy. Soc.*, London 203, 385 (1904) and 205, 237 (1906). The Garnett work considered only liquid or glass hosts with metallic particles. Both the host and the particles were characterized as having linear responses. The effects obtained (color variations) depended upon absorption. Nonlinear optics was not involved. The field of nonlinear optics did not exist until the development of the laser which provided radiation of sufficient intensity to excite nonlinear effects. Composite systems involving nonlinear particles in a linear host have been reported. See D. Ricard, P. Roussignol and C. Flytzanis, *Optics Lett.* 10, 511 (1985); F. Hache, D. Ricard and C. Flytzanis, *J. Optic Soc. Am., B* 3,1647 (1986); K. C. Rustagi and C. Flytzanis, *Opt, Lett.* 9, 334 (1984); P. Roussignol, D. Ricard, J. Lukasik and C. Flytzanis, *J. Opt. Soc. Am.* B 4, 5 (1987); G. S. Argarwal and S. Dutta Gupta, *Phys. Rev.* A 38,5678 (1988); and J. W. Haus et al., *J. Opt. Soc. Am.* B 6,797 (1989). All of the material systems reported utilized a host (water or glass) with a linear, rather than a nonlinear response. Nonlinear, but absorbing, particles were reported in the articles authorized by Flytzanis and others and enhancements in the value of the nonlinear susceptibility were reported. Such enhancements in nonlinear response were measured against either the nonlinear susceptibility of the components of the composite or a nonlinear material which has often been used as a standard, namely carbon disulfide ($CS_2$).

The present invention is based upon the discovery that the presence of a nonlinear host in the composite (more than a linear host which merely supports or suspends the nonlinear particles) makes an appreciable contribution to the nonlinear susceptibility of the composite. Moreover, the use of a nonlinear host enables the enhancement of the optical nonlinearity to be achieved even where the materials are nonabsorbing (for the case in which both components are lossless or at least the host is lossless). By sacrificing, some absorption in the inclusion component, even greater enhancement in optical nonlinearity can be achieved.

As noted above, the earliest theory to deal with the optical properties of such composites is due to Maxwell Garnett. There the composite material is assumed to be comprised of spherical inclusion particles embedded in a host material. Both the inclusion particles and host are isotropic and respond linearly to the incident light. The article by Argarwal and Dutta Gupta, and the article by Haus et al., referred to above, present theoretical studies of composite nonlinear optical materials based on the Maxwell Garnett model with a nonlinear response in the inclusion material, but not in the host.

We present a full generalization of the Maxwell Garnett model which shows the nonlinear correction to the effective medium dielectric constant and consider the case where either or both the host and inclusion components possess a third-order nonlinear optical response, which for isotropic materials can be characterized by two parameters usually denoted A and B, and in terms of those parameters and the dielectric constants of the constituent materials we derive expressions for the parameters A and B of the effective medium. The parameters A and B express the third-order nonlinear susceptibility as explained in Section 4.2 of the text, Nonlinear Optics, by Robert W. Boyd, Academic Press (1992). We show that the composite materials can possess a nonlinear susceptibility larger than that of its constituents, and for a nonlinear host material, the tensor properties of the nonlinear susceptibility of the composite are considerably enhanced (by a factor of five) over the pure host material. A similar enhancement, perhaps somewhat smaller, exists for the second-order nonlinear susceptibility. The host is then anisotropic, Material systems which presently are believed useful are also discussed.

We present our showing with the following organization. First we present the model of tlie composite material topology and the basic equations that govern the electromagnetic fields in it. Then we give a heuristic derivation of the relation between the mesoscopic and macroscopic electric fields. A more rigorous derivation of essentially the same result is presented in Appendix I. Then we derive the Maxwell Garnett result for the effective-medium dielectric constant. We then consider the case of nonlinearity first in the inclusion material, and then in the host material. Some geometrical formulas used in the section on the case where the host is nonlinear are derived in Appendix II. Example results for composite nonlinear susceptibilities are given in the sections on the nonlinear inclusions and host. We summarize our results and consider the case of nonlinearity in both the host and inclusion materials in a final section.

While the inclusions are treated in a topology where the inclusions are spherical and distributed on the host, the particles can be elongated (e.g. elliptical). The topology of a composite material may consist of two or more interdispersed components, i.e. the particles being part of a matrix containing the host.

It is therefore the principal object of this invention to provide an improved system for processing of optical radiation utilizing a composite material system presenting an enhanced nonlinear susceptibility to the radiation.

It is another object of the invention to provide improved optical devices wherein nonlinear optical interactions occur.

It is a still further object of the invention to provide improved methods of processing optical radiation and devices and optical systems, all utilizing composite material systems having enhanced nonlinear susceptibility.

It is a still further object of the invention to provide improved systems for optical radiation and signal processing, improved devices in which nonlinear optical interactions occur and improved methods of processing optical radiation and signals nonlinearly, dependent upon the intensity of the radiation or the signals, in which composite material systems having enhanced nonlinear susceptibility are used.

Briefly described, therefore, the invention provides a system for processing optical radiation to provide nonlinear response which is a function of the intensity of the radiation. A body of composite material (a material system) is used having a host material component and an inclusion material component. At least the host has an optical response which varies nonlinearly with the amplitude of an optical field applied to the body. Means are provided for applying the field to the body at sufficient intensity to induce the nonlinear response of the body to the field. The nonlinear response is defined by a nonlinear susceptibility greater than the susceptibility of either of the host or inclusion components above.

BRIEF DESCRIPTION OF THE DRAWINGS

The foregoing and other objects, features an advantages of the invention as well as the best mode now known for practicing the invention and preferred embodiments thereof will become more apparent from a reading of the following description in connection with the accompanying drawings in which:

in FIG. 3 and FIG. 4 both the host and material components being nonabsorbing of the optical radiation.

THE MODEL AND BASIC EQUATIONS

We assume a composite topology where small particles, which we call inclusions, are distributed in a host medium. As an approximation, the inclusions are assumed to be spheres of radius a.

Preferrably the particles are small with diameters of the order of 50 Angstroms. This reduces scattering since the scattering cross section $\sigma$ of a small dielectric particle depends on the particle radius a as $a^6$, and consequently the attenuaion coefficient $\alpha=N\sigma$, where $N=3f/4\pi a^3$ is the number density of inclusion particles, can be made arbitrarily small even at a fill fraction approaching unity by using particles of sufficiently small radius $a$. For 50-angstrom-diameter inclusion particles, the predicted attenuation coefficeint is less than 1 $cm^{-1}$.

Figure 1:
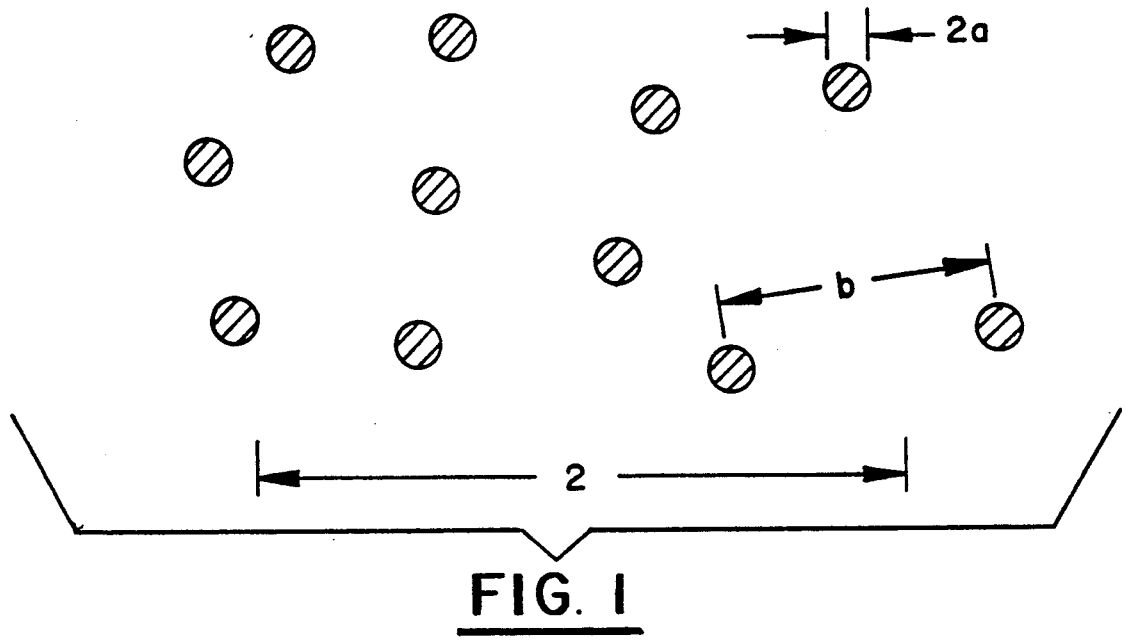
FIG. 1 is a schematic diagram illustrating the topology of a composite material system (the architecture of a body of composite material) which is provided for use in systems, devices and methods embodying the invention.

We define the characteristic distance between inclusion particles to be b, and we assume that $$a << b << \lambda, \quad (2.1)$$

where $\lambda$ is the wavelength of light in vacuum at frequencies of interest (see FIG. 1). Denoting the electric and magnetic field vectors by $\vec{e}(\vec{r},t)$ and $\vec{b}(\vec{r},t)$, respectively, we write the Maxwell equations in the form:

$$\nabla \cdot \vec{e}(r,t) = -4\pi \nabla \cdot \vec{p}(r,t) \quad (2.2)$$
$$\nabla \cdot \vec{b}(r,t) = 0$$
$$\nabla \times \vec{e}(r,t) + \frac{1}{c} \frac{\partial}{\partial t} \vec{b}(r,t) = 0$$
$$\nabla \times \vec{b}(r,t) - \frac{1}{c} \frac{\partial}{\partial t} \vec{e}(r,t) = \frac{4\pi}{c} \frac{\partial}{\partial t} \vec{p}(r,t),$$

where $\vec{p}(\vec{r},t)$ is the dipole moment per unit volume, and where magnetic effects are assumed to be negligible. We seek stationary solutions of these equations of the form $$e(r,t) = e(r)e^{-\omega t}30 \ c.c. \quad (2.3)$$

We describe the dielectric response of the material system by means of the relation $$p(r) = \chi(r)e(r) + p^{NL}(r), \quad (2.4)$$

where $$\chi(r) = \chi^i, \text{ if } r \text{ designates a point within an inclusion}, \quad (2.5)$$
$$= \chi^h, \text{ if } r \text{ designates a point within the host},$$

is the spatially varying linear susceptibility, and where $\vec{p}^{NL}(\vec{r})$ is the non-linear polarization, discussed in detail in the section entitled "nonlinearity in the inclusions." We define $$p(r) \equiv (\chi^i - \chi^h)e(r), \text{ if } r \text{ designates a point} \quad (2.6)$$
$$\text{within an inclusion},$$
$$= 0, \text{ if } r \text{ designates a point within the host},$$

and combine Eqs. (2.2) through (2.6), the Maxwell equations (2.2) become $$\nabla \cdot [\epsilon^h e(r)] = -4\pi \equiv \cdot p^s(r)$$
$$\nabla \cdot b(r) = 0$$
$$\nabla \times e(r) - i\omega b(r) = 0$$
$$\nabla \times b(r) + i\omega \epsilon^h e(r) = -4\pi i\omega p^s(r), \quad (2.7)$$

with $\omega \equiv \omega/c$, where the inclusion and host linear dielectric constants are given by $$\epsilon^{i,h} = 1 + 4\pi \chi^{i,h}, \quad (2.8)$$

and where we have introduced the "source" polarization $$\vec{p}^s(\vec{r}) \equiv \vec{p}'(\vec{r}) + \vec{p}^{NL}(\vec{r}). \quad (2.9)$$

We have used lower case letters ($\vec{e}$, $\vec{b}$, etc.) for the electromagnetic fields appearing in these equations because, although we have adopted a macroscopic description of each constituent of the composite, we next introduce a "more macroscopic" description which we obtain by averaging the fields over a volume that contains many inclusions. We perform this average through the use of a smoothly varying weighting function $\Delta(\vec{r}) = \Delta(r)$, where $r = |\vec{r}|$. The volume integral of $\Delta(\vec{r})$ is normalized to unity, $$\int \Delta(r - e') dr' = 1, \quad (2.10)$$

and it has a range R satisfying the inequalities $$b >> R >> \lambda. \quad (2.11)$$

The averaged fields are then defined by $$E(r) = \int \Delta(r - r')e(r')dr',$$
$$P(r) = \int \Delta(r - r')p(r')dr',$$
$$P^{NL}(r) = \int \Delta(r - e')p^{NL}(r')dr', \quad (2.12)$$

etc., where the integrals are to be performed over all space. It is easily confirmed that this averaging procedure commutes with differentiation, e.g., $$\frac{\partial E(r)}{\partial x} = \int \frac{\partial \Delta(r - r')}{\partial x} e(r')dr' \quad (2.13)$$
$$= -\int \frac{\partial \Delta(r - r')}{\partial x'} e(r')dr'$$
$$= \int \Delta(r - r') \frac{\partial e(r')}{\partial x'} dr'$$

where the third of Eqs. (2.13) follows from the second by a partial integration and the assumption that $\Delta(\vec{r} - \vec{r}') \to 0$ as $|\vec{r} - \vec{r}'| \to \infty$. By performing an average of the Maxwell equations (2.7), we thus find that $$\nabla \cdot [\epsilon^h E(r)] = -4\pi \nabla \cdot P^s(r)$$
$$\nabla \cdot B(r) = 0$$
$$\nabla \times E(r) - i\omega B(r) = 0$$
$$\nabla \times B(r) + i\omega \epsilon^h E(r) = -4\pi i\omega P^s(r), \quad (2.14)$$

where $$\vec{P}^s(\vec{r}) \equiv \vec{P}'(\vec{r}) + \vec{P}^{NL}(\vec{r}). \quad (2.15)$$

Our goal is to find a constitutive relation between $\vec{P}^s(\vec{r})$ and $\vec{E}(\vec{r})$. Since the range R of $\Delta(\vec{r})$ is very much larger than the characteristic separation b of the inclusions. The resulting linear and nonlinear susceptibilities can be expected to be spatially uniform; however, since $R << \lambda$, these averaged fields can be used to describe the propagation of light through the medium (the composite body). The resulting susceptibilities thus characterize an "effective medium" that describes the optical properties of the composite material system, and we refer to the averaged fields $\vec{E}(\vec{r})$, $\vec{B}(\vec{r})$, etc. as "macroscopic fields." We refer to the fields $\vec{e}(\vec{r})$ and $\vec{b}(\vec{r})$ as "mesoscopic fields", since they contain more spatial information than the macroscopic fields, but yet are themselves averages of the microscopic electric and magnetic fields, which vary greatly over interatomic distances.

MESOSCOPIC AND MACROSCOPIC FIELDS: A SIMPLE PHYSICAL ARGUMENT

Since the mesoscopic polarization $\vec{p}(\vec{r})$ is a known function of the mesoscopic electric field $\vec{e}(\vec{r})$ (see Eqs. 2.4 through 2.6 and section 5), we derive a constitutive relation between $\vec{P}(\vec{r})$ and $\vec{E}(\vec{r})$, relating $\vec{e}(\vec{r})$ to $\vec{E}(\vec{r})$.

Then $\vec{p}(\vec{r})$ can be related to $\vec{E}(\vec{r})$, and the spatial average of $\vec{p}(\vec{r})$ will give $\vec{P}(\vec{r})$ in term of $\vec{E}(\vec{r})$.

It turns out that one can derive a relation between $\vec{e}(\vec{r})$ and $\vec{E}(\vec{r})$ that is both rigorous and useful. That relation is derived in Appendix I, and used in the ensuing sections hereof to derive the constitutive relation of the composite medium. In this section we present a simple physical argument that leads to essentially the same result as that derived in Appendix I. This simple physical argument, which follows the original argument of Lorentz, in his text "Theory of Electrons," Dover, New York (1952). It is somewhat h euristic, but shows why the rigorous result derived in Appendix I is physically reasonable.

Figure 2:
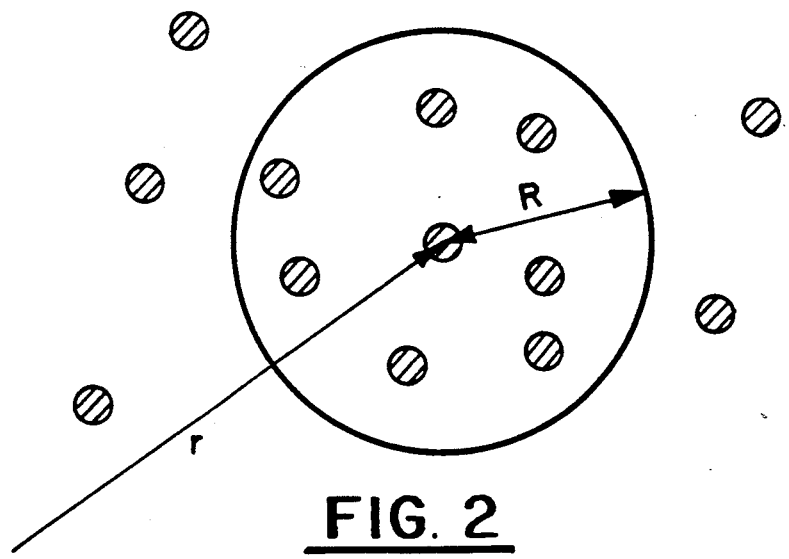
FIG. 2 is a schematic diagram similar to FIG. 1 showing a sphere of radius R centered on a point r arrow, which may lie either in an inclusion (a particle) or in the host component of the material system.

We wish to relate $\vec{e}(\vec{r})$, which is given by the particular solution of the mesoscopic Maxwell Eqs. (2.7) plus a homogenous solution, to $\vec{E}(\vec{r})$, which is given by the particular solution of the macroscopic Maxwell Eqs. (2.14) plus a homogeneous solution of those equations. We surround the point $\vec{r}$ by a sphere of radius R centered at r (see FIG. 2), and we write $$e(r)=e^o(r)+e^{in}(r)+e^{out}(r)$$
$$E(r)=E^o(r)+E^{in}(r)+E^{out}(r), \quad (3.1)$$

where $\vec{e}^o(\vec{r})$ and $\vec{E}(\vec{r})$ are the abovementioned homogeneous solutions. We define $\vec{e}^{in}(\vec{r})$ to be the contribution to $\vec{e}(\vec{r})$ from $\vec{p}^s(\vec{r}')$ taken at points $\vec{r}'$ within the sphere, and $\vec{e}^{out}(\vec{r})$ to be the contribution from points $\vec{r}'$ outside the sphere. Likewise, $\vec{E}^{in}(\vec{r})$ and $\vec{E}^{out}(\vec{r})$ contain respectively the contributions to $\vec{E}(\vec{r})$ from $\vec{P}^s(\vec{r}')$ taken at points $\vec{r}'$ inside and outside the sphere. Now, since $\vec{E}^o(\vec{r})$ is the spatial average of $\vec{e}^o(\vec{r})$ over a distance of the order of R, and $\vec{e}^o(\vec{r})$ varies only over distances of order $\lambda$, which is very much greater than R, we may take $\vec{e}^o(\vec{r}) \approx \vec{E}^o(\vec{r})$. Further, since we have assumed that R>>b, the precise locations of the inclusions outside the sphere are unimportat in determining $\vec{e}^{out}(\vec{r})$, and to good approximation we may take $\vec{e}^{out}(\vec{r}) \approx \vec{E}^{out}(\vec{r})$. Then, combining Eqs. (3.1), we have $$e(r)-E(r)=e^{in}(r)-E^{in}(r). \quad (3.2)$$

Next, since $R<<\lambda$, we can use the laws of electrostatics (the $\omega \to 0$ limit of the Maxwell equations) in estimating both $\vec{e}^{in}(\vec{r})$ and $\vec{E}^{in}(\vec{r})$. For the latter, we ccan also assume that $\vec{P}^s(\vec{r})$ is effectively uniform over the sphere, and so Eqs. (2.14) in the electrostatic limit can be shown to yield $$E^{in}(r) = -\frac{4\pi}{3\epsilon^h} P^s(r). \quad (3.3)$$

We find $\vec{e}^{in}(\vec{r})$ by solving Eqs. (2.7) in the electrostatic limit, and then restricting the source term $\vec{p}^s(\vec{r}')$ that appears in the solution to points $\vec{r}'$ within the sphere ($|\vec{r}-\vec{r}'|>R$). The result is can be shown to be $$e^{in}(r) = \int_{\eta \leq |r-r'| \leq R} T(r-r') \cdot p^s(r')dr' - \frac{4\pi}{3\epsilon^h} p^s(r), \quad (3.4)$$

where the radius $\eta$ of the region excluded from the integration is allowed to go to zero after the integral in Eq. (3.4) is performed. This integral involves the static dipole-dipole coupling tensor for a medium of dielectric constant $\epsilon^h$, which is given by $$T(r) = \frac{3rr - U}{\epsilon^h r^3}, \quad (3.5)$$

where $\vec{r}=\vec{r}/r$ and $U=xx+yy+zz$. Defining $$T^o(r) = T(r) \quad r > \eta$$
$$= 0 \quad r < \eta \quad (3.6)$$

and a cut-off function $$c'(r) = 1 \quad r < R$$
$$= 0 \quad r > R. \quad (3.7)$$

we can combine Eqs. (3.2), (3.3), and (3.4) to give $$e(r) = E(r) + \frac{4\pi}{3\epsilon^h} P^s(r) + \quad (3.8)$$

$$\int T^o(r-r')c'(r-r') \cdot p^s(r')dr' - \frac{4\pi}{3\epsilon^h} p^s(r).$$

This equation is the central result of this section. It shows how the difference between $\vec{e}(\vec{r})$ and $\vec{E}(\vec{r})$ depends only on $\vec{p}^s(\vec{r}')$ at points $\vec{r}'$ within a distance $R<<\lambda$ of $\vec{r}$ (cf. Eq. 3.2). This result is used in deriving, to good approximation, a local relation between $\vec{P}^s(\vec{r})$ and $\vec{E}(\vec{r})$ in the ensuing sections hereof.

THE MAXWELL GARNETT EQUATIONS

In this section we derive the Maxwell Garnett equations, which provide a good approximate description of the linear optical properties of a composite medium of the topology shown in FIG. 1. This result is of course well known (see the articles by J. C. Maxwell Garnett referenced above), but we recover it here both to illustrate our approach and to illustrate the nature of the approximations involved. In addition, we obtain some results that are needed for the calculation of the nonlinear optical response that is presented in the following sections.

In both this section and the next, we use the rigorous form of Eq. (3.8), as derived in Appendix I. There, using only the mesoscopic Maxwell Eqs. (2.7), the macroscopic Maxwell Eqs. (2.14), and the definitions (see Eq. (2.12)) of macroscopic fields in terms of mesoscopic fields, we find an exact relation (I.43) between $\vec{e}(\vec{r})$ and $\vec{E}(\vec{r})$ for a $\Delta(r)$ characterized by any range R. For $R<<\lambda$, that result reduces to $$e(r) = E^c(r) - \frac{4\pi}{3\epsilon^h} p^s(r) + \int T^c(r-r') \cdot p^s(r')dr', \quad (4.1)$$

where $$E^c(r) = E(r) + \frac{4\pi}{3\epsilon^h} P^s(r) \quad (4.2)$$

is the so-called "cavity field" (the $\vec{E}(\vec{r})-\vec{E}^{in}(\vec{r})$ of section 3). Here $$T^c(r) = T^o(r)c(r) \quad (4.3)$$

is the product of $T^o(\vec{r})$ (Eq. 3.6) and a cut-off function $c(r)$ ($c(0)=1$, $c(r) \to 0$ as $r \to \infty$). The function $c(r)$ is not the simple cut-off function $c'(r)$ that appeared in section 3 (Eq. 3.7), but is given by Eq. (I.60); nonetheless, $c(r)$ has a range on the order of R.

We next note three useful results that follow from the properties of the static dipole tensor:

$$\int T^c(r-r')dr' = 0, \tag{4.4a}$$

$$\int_{\substack{\text{sphere,}\\ r \in \text{sphere}}} T^0(r-r')dr' = 0 \tag{4.4b}$$

$$\int_{\substack{\text{sphere,}\\ r' \text{ sphere}}} T^0(r-r')dr = \frac{4\pi}{3} a^3 T(r_o - r'). \tag{4.4c}$$

In the first equation, the range of integration is over all space and the result follows from the fact that $c(r)$ depends only on $r=|\vec{r}|$, and that the integral of $T^o(\vec{r})$ over solid angle, for fixed $r$, vanishes. In the second two, the range of integration is the interior of a sphere of radius $a$; in Eq. (4.4b) $\vec{r}$ is any point within the sphere, while in Eq. (4.4c) $\vec{r}'$ is a point outside the sphere and $\vec{r}_o$ the position of the center of the sphere. Eqs. (4.4b) and (4.4c) may be derived, e.g., by using the fact that $T(\vec{r}) \epsilon_h^{-1}\nabla\nabla r^{-1}$, and using Gauss' theorem.

We now return to a consideration of the polarization of the medium. From Eq. (2.6) we have $$4\pi p'(r'') = (\epsilon^i - \epsilon^h)\theta^i(r'')e(r''), \tag{4.5}$$

where we have used Eq. (2.8) and where we define $\theta^i(\vec{r})=1$ if the point $\vec{r}''$ is in an inclusion and $\theta^i(\vec{r}'')=0$ if $\vec{r}''$ is in the host. Next, we use Eq. (4.1) and neglect any nonlinear behavior $(\vec{p}^{NL}(\vec{r})=0)$; then $\vec{p}^s(\vec{r})=\vec{p}'(\vec{r})$ (Eq. 2.9), and Eq. (4.5) yields $$4\pi p'(r'') = (\epsilon^i - \tag{4.6}$$

$$\epsilon^h)\theta^i(r'')\left[E^c(r'') - \frac{4\pi}{3\epsilon^h}p'(r'') + \int T^c(r'' - r') \cdot p'(r')dr'\right] =$$

$$3\epsilon^h\beta\theta^i(r'')[E^c(r'') + \int T^c(r'' - r') \cdot p'(r')dr'].$$

where we have put $$\beta = \frac{\epsilon^i - \epsilon^h}{\epsilon^i + 2\epsilon^h}. \tag{4.7}$$

We now wish to use Eq. (4.6) in the expression for $\vec{P}'$ see Eq. 2.12), $$P'(r) = \int \Delta(r-r')p'(r'')dr'', \tag{4.8}$$

for which we need $\vec{p}'(\vec{r}'')$ at points $\vec{r}''$ within approximately R of $\vec{r}$. We next introduce the standard approximations that are made in deriving the Maxwell Garnett equation. The crucial ansatz is that, at points $\vec{r}''$ within R of $\vec{r}$, $\vec{p}'(\vec{r}'')$ within the inclusions can be approximated in Eq. (4.8) by a uniform value that we call $\vec{p}_{script}(\vec{r})$. That is, $\vec{p}'(\vec{r}'')$ in Eq. (4.8) can be replaced by $\vec{p}_{script}(\vec{r})\theta^i(\vec{r}'')$, and we find $$P'(r) = fp_{script}(r), \tag{4.9}$$

where $$f = \int \Delta(r-r'')\theta^1(r'')dr'' \tag{4.10}$$

is the macroscopic fill fraction of inclusions, here for simplicity assumed to be essentially uniform throughout the medium. To find an expression for $\vec{P}_{script}(\vec{r})$, we return to Eq. (4.6).

Look first at the term involving $T^c$: For a point $\vec{r}''$ in a given inclusion, the integral over points $\vec{r}'$ in the same inclusion will give zero by virtue of Eq. (4.4b), the assumption of a mesoscopically uniform $\vec{p}_{script}(\vec{r})$, and the fact that $c(\vec{r}''-\vec{r}')$ is essentially uniform over consider the integral over points $\vec{r}'$ in different inclusions. Since the range R of $c(\vec{r}''-\vec{r}')$ satisfies $R >> b$, there are many neighboring inclusions involved. If these inclusions are randomly distributed with respect to the first inclusion, we expect on average no contribution from the integral, by virtue of the assumption of a mesoscopically uniform $\vec{p}_{script}(\vec{r})$ and Eq. (4.4a). Neglecting the corrections that could result from any correlations in the positions of the inclusions, we set the total contribution from the integral involving $T^c$ equal to zero.

Next, note that in Eq. (4.6) $\vec{E}^c(\vec{r}'')$is already a macroscopic field, obtained from the spatial average over a range R of the mesoscopic field $\vec{e}(\vec{r}) +4\pi\vec{p}'(\vec{r})3\epsilon^h$. Thus, its variation over distances of order R can be expected to be small, and we can set $\vec{E}^c(\vec{r}'')\simeq\vec{E}^c(\vec{r})$ in Eq. (4.6) for points $\vec{r}''$ within R of $\vec{r}$. It is then clear that the mesoscopically uniform polarization $\vec{p}_{script}(\vec{r})$ appearing in Eq. (4.9) should be taken as $$4\pi_{script}(r) = 3\epsilon^h\beta E^{cl}(r). \tag{4.11}$$

Using Eq. (4.11) in (4.9), and recalling that here $$E^c(r) = E(r) + \frac{4\pi}{3\epsilon^h}P(r), \tag{4.12}$$

(Eq. 4.2 with $\vec{P}^{NL}=0$), we find that $$4\pi P(r) = 3\epsilon^h\beta f(1-\beta f)^{-1}E(r). \tag{4.13}$$

Finally, using Eq. (2.6) in Eq. (2.4) we have, neglecting nonlinear effects, $$p(r) = \chi^h e(r) + p'(r)$$

$$P(r) = \chi^h E(r) + P'(r), \tag{4.14}$$

where the second of Eqs. (4.14) comes from spatial averaging the first. The total displacement $\vec{D}(\vec{r})$ is thus given by $$D(r) = E(r) + 4\pi P(r) = \epsilon^h E(r) + 4\pi P'(r) \equiv \epsilon E(r), \tag{4.15}$$

where the last of Eqs. (4.15) defines the effective-medium dielectric constant $\epsilon$. Using Eq. (4.13) in Eq. (4.15), we find that $\epsilon$ satisfies $$\frac{\epsilon - \epsilon^h}{\epsilon + 2\epsilon^h} = \beta f, \tag{4.16}$$

which is the usual Maxwell Garnett result.

We close this section by deducing some relations that will prove useful in the following section. Using Eqs. (4.13) and (4.16) in Eq. (4.12) we find that $$E^c(r) = \frac{\epsilon + 2\epsilon^h}{3\epsilon^h} E(r). \tag{4.17}$$

Next, we combine Eqs. (4.5), (4.11), and (4.17) to determine the mesoscopic electric field $\vec{e}(\vec{r})$ inside an inclusion; the result is $$e(r) = \frac{\epsilon + 2\epsilon^h}{\epsilon^i + 2\epsilon^h} E(r), \quad (4.18)$$

if $\vec{r}$ lies in an inclusion. The mesocopic field $\vec{e}(\vec{r})$ at points outside an inclusion is given below in Eq. (6.4). Finally, the dipole moment $\mu$ of an inclusion associated with the polarization $\vec{p}_{script}(\vec{r})$ of Eq. (4.11) is given by $$\mu = \frac{4\pi}{3} a^3 p_{script}(r) = a^3 \epsilon^h \beta E^c(r). \quad (4.19)$$

NONLINEARITY IN THE INCLUSIONS

We now turn to the nonlinear problem, where $\vec{p}^{NL}(\vec{r}) \neq 0$. Combining Eqs. (2.4) and (2.6), we find that the total mesoscopic polarization can be expressed as $$p(r) = \chi^h e(r) + p'(r) + p^{NL}(r), \quad (5.1)$$

(cf. Eq. 4.14). Spatial averaging of this result gives $$P(r) = \chi^h E(r) + P'(r) + P^{NL}(r), \quad (5.2)$$

and introducing the definition of $\vec{D}(\vec{r})$ we have $$D(r) = E(r) + 4\pi P(r) = \epsilon^h E(r) + 4\pi P'(r) + 4\pi P^{NL}(r). \quad (5.3)$$

For a medium that is weakly nonlinear, we expect that, when $\vec{P}'(\vec{r})$ and $\vec{P}^{NL}(\vec{r})$ are written to third order in the electric field strength $\vec{E}(\vec{r})$, we will have a relation of the form $$D(r) = \epsilon E(r) + 4\pi A[E(r)\cdot E^*(r)]E(r) + \pi B[E(r)\cdot E(r)]E^*(r). \quad (5.4)$$

where the tensor nature of the third-order terms in Eq. (5.4) follows from symmetry arguments if, at the macroscopic level, the medium is isotropic. We neglect nonlinear processes such as third-harmonic generation, and concern ourselves only with the nonlinear modification of the propagation of light at its incident frequency. The two parameters A and B are in general independent, although for electronic nonlinearities we must have $A - B \to 0$ as $\omega \to 0$. The determination of A and B in terms of the corresponding nonlinear coefficients of the host and inclusions is the problem to which we now turn.

In the present section, we treat the problem in which only the inclusion material responds nonlinearly to the optical field. Assuming for simplicity that the inclusion material is itself isotropic and uniform, we then have a nonlinear polarization of the form $$p^{NL}(r) = \theta^i(r) p^{NL,i}(r), \quad (5.5)$$

where $$p^{NL,i}(r) = A^i[e(r)\cdot e^*(r)]e(r) + \tfrac{1}{2} B^i[e(r)\cdot e(r)]e^*(r), \quad (5.6)$$

and where $A^i$ and $B^i$ are the nonlinear coefficients of the inclusion material. Since we are looking only for the lowest-order macroscopic nonlinearity (Eq. 5.4), it suffices to estimate $\vec{e}(\vec{r})$ in Eq. (5.6) from the results of a calculation that neglects the nonlinearity itself. That is, we use Eq. (4.18) in Eq. (5.6) to obtain $$p^{NL,i}(r) = \left| \frac{\epsilon + 2\epsilon^h}{\epsilon^i + 2\epsilon^h} \right|^2 \left( \frac{\epsilon + 2\epsilon^h}{\epsilon^i + 2\epsilon^h} \right) \{ A^i[E(r) \cdot E^*(r)]E(r) + \tfrac{1}{2} B^i[E(r)\cdot E(r)]E^*(r)\}. \quad (5.7)$$

Next, we average Eq. (5.5) (cf. Eqs. 2.12 and 5.7) to find $\vec{P}^{NL}(\vec{r})$. Using the fact that $\vec{E}(\vec{r})$ can be assumed to vary little over a range R, and using expression (4.10) for f, we find that $$P^{NL}(r) = f \left| \frac{\epsilon + 2\epsilon^h}{\epsilon^i + 2\epsilon^h} \right|^2 \left( \frac{\epsilon + 2\epsilon^h}{\epsilon^i + 2\epsilon^h} \right) [A^i[E(r) \cdot E^*(r)]E(r) + \tfrac{1}{2} B^i[E(r)\cdot E(r)]E^*(r)]. \quad (5.8)$$

Referring back to Eqs. (5.2)–(5.4), we see that, in order to determine $\vec{D}(\vec{r})$ and subsequently to find expressions for A and B, our remaining task is to find $\vec{P}'(\vec{r})$. This result cannot be taken simply from the linear calculation of section 4, because $\vec{p}^{NL}(\vec{r})$ makes a contribution to $\vec{e}(\vec{r})$ and thus to $\vec{p}'(\vec{r})$ to lowest nonvanishing order in the nonlinearity. From Eq. (4.5) we have $$4\pi p'(r'') = (\epsilon^i - \epsilon^h)\theta^i(r'')e(r''), \quad (5.9)$$

but we must now use the full set of Eqs. (4.1) and (4.2), with $\vec{p}^s(\vec{r}'') = \vec{p}'(\vec{r}) + \vec{p}^{NL}(\vec{r})$, $\vec{P}^s(\vec{r}) = \vec{P}'(\vec{r}) + \vec{P}^{NL}(\vec{r})$. Equation (5.9) thereby becomes $$\begin{aligned} 4\pi p'(r'') &= (\epsilon^i - \epsilon^h)\theta^i(r'') \left[ E^c(r'') - \frac{4\pi}{3\epsilon^h} p'(r'') - \frac{4\pi}{3\epsilon^h} p^{NL,i}(r'') + \int T^c(r'' - r') \cdot [p'(r') + P^{NL}(r')] dr' \right] \\ &= 3\epsilon^h \beta \theta^i(r'') \left[ E^c(r'') - \frac{4\pi}{3\epsilon^h} p^{NL,i}(r'') + \int T^c(r'' - r')[p'(r') + P^{NL}(r')] dr' \right], \end{aligned} \quad (5.10)$$

where $\beta$ is given by Eq. (4.7), and where the cavity field now contains a nonlinear contribution and is given by $$E^c(r) = E(r) + \frac{4\pi}{3\epsilon^h} P'(r) + \frac{4\pi}{3\epsilon^h} P^{NL}(r). \quad (5.11)$$

It follows from the discussion after Eq. (4.8) that $\vec{p}'(\vec{r}'')$ can be approximated within the inclusion by a mesoscopically uniform value, to be denoted by $\vec{p}_{script}(\vec{r})$, at points $\vec{r}''$ within R of $\vec{r}$; then as in section 4, $$P'(r) = f p_{script}(r). \quad (5.12)$$

Note that, from Eq. (5.7) and the fact that $\vec{E}(\vec{r})$ varies little over a range of R $\vec{p}^{NL,i}(\vec{r}'')$ has also been taken to be uniform in this sense, $\vec{p}^{NL,i}(\vec{r}'') = \theta^i(\vec{r}'')\vec{p}^{NL}_{script}(\vec{r})$. As discussed after Eq. (4.8.) we see that again we may neglect contributions from the integral involving $T^c$, and we find (instead of Eqs. 4.11, 4.12) that $$4\pi p_{script}(r) = 3\epsilon^h \beta \left[ E^c(r) - \frac{4\pi}{3\epsilon^h} p^{NL}_{script}(r) \right], \quad (5.13)$$

$\vec{E}^c(\vec{r})$ is given by Eq. (5.11). Combining Eqs. (5.7–5.8, 5.11–5.13), we can solve for $\vec{P}'(\vec{r})$; in fact, it is clear from Eq. (5.3) that we need the sum of $\vec{P}'(\vec{r})$ and $\vec{P}^{NL}(\vec{r})$, for which we find $$P'(r) + P^{NL}(r) = \frac{\epsilon - \epsilon^h}{4\pi} E(r) + \left( \frac{\epsilon + 2\epsilon^h}{\epsilon^i + 2\epsilon^h} \right) P^{NL}(r), \quad (5.14)$$

where $\vec{P}^{NL}(\vec{r})$ is given by Eq. (5.8) and c is given by Eq. (4.16). Using Eqs. (5.8) and (5.14) in Eq. (5.3) and comparing with Eq. (5.4), we identify $$A = f \left| \frac{\epsilon + 2\epsilon^h}{\epsilon^i + 2\epsilon^h} \right|^2 \left( \frac{\epsilon + 2\epsilon^h}{\epsilon^i + 2\epsilon^h} \right)^2 A^i \quad (5.15)$$

$$B = f \left| \frac{\epsilon + 2\epsilon^h}{\epsilon^i + 2\epsilon^h} \right|^2 \left( \frac{\epsilon + 2\epsilon^h}{\epsilon^i + 2\epsilon^h} \right)^2 B^i$$

as the nonlinear coefficients of the effective medium. Note that the "local field correction factor," in this case $(\epsilon + 2\epsilon^h)/(\epsilon^i + 2\epsilon^h)$, appears in fourth-order in Eqs. (5.15); three powers enter because the nonlinearity is cubic in the field (Eqs. 5.6 and 5.8), while the fourth appears because the material also responds linearly to the field generated by the nonlinear polarization (Eqs. 5.13 and 5.14).

Figure 3:
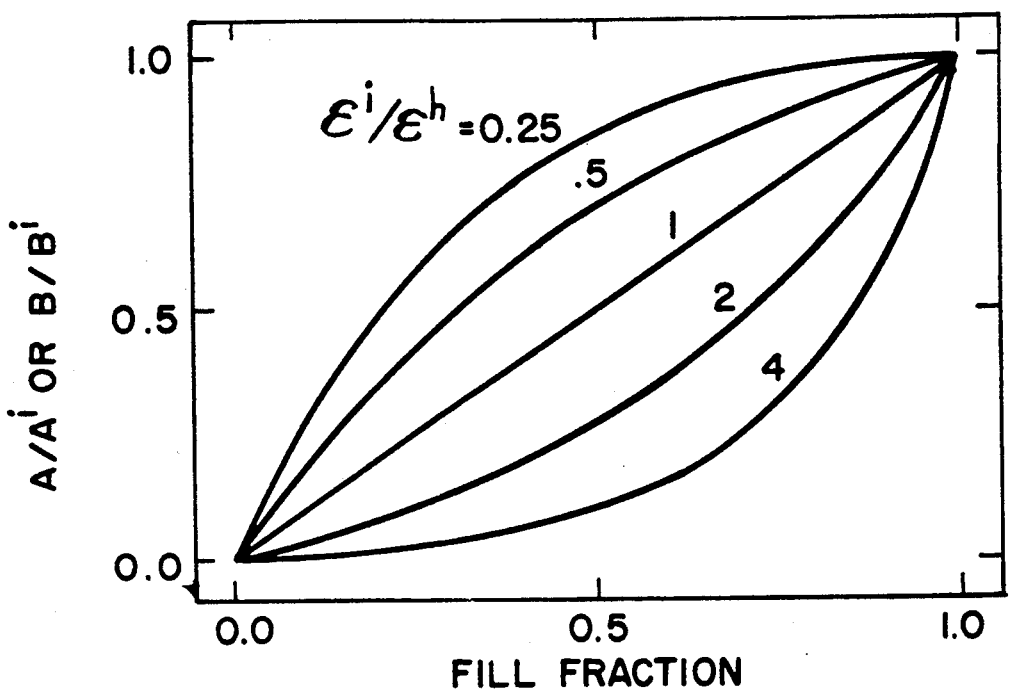
FIG. 3 is a plot showing the variations of the nonlinear coefficients A and B of a composite optical material system with fill fraction f (the fraction of the volume of the material system constituted of the inclusions) for several different values of the ratios of linear dielectric constants.

The results given by Eqs. (5.15) are illustrated graphically in FIG. 3. There the vertical axis can be taken to represent either the nonlinear coefficient A of the composite normalized to the nonlinear coefficient $A^i$ of the inclusion material or the value of B for the composite normalized to the nonlinear coefficient $B^i$ of the inclusion material. The horizontal axis gives the fill fraction f of the nonlinear material. For illustrative purposes we have plotted these curves over the entire range $0 \leq f \leq 1$, even though inter-inclusion correlations not included in this theory can in general be expected to modify significantly the results if we do not have $f << 1$. For the case in which the linear dielectric constants of the host and inclusion materials are equal, we see that the nonlinear coefficients of the composite are simply equal to those of the inclusion multiplied by the fill fraction f. Thus there is no enhancement in the nonlinear coefficients and of the nonlinear susceptibility. More generally, we see that the nonlinearity of the composite material increases with f at a rate that is either more or less rapid than linear, depending upon the ratio of the linear dielectric constants. This result can be appreciated in that for an inhomogeneous material having the illustrated topology, the electric field will tend to become concentrated in regions of lower dielectric constant. For $\epsilon^i < \epsilon^h$, the electric field within the nonlinear component (the inclusion material) will be larger than the spatially averaged electric field, thus enhancing the effective nonlinearity of the composite material.

Note also that Eqs. (5.15) predict that, for the case in which only the inclusion material is nonlinear, the ratio of nonlinear coefficient A/B for the composite is equal to the ratio $A^i/B^i$ of the inclusion material. In the next section, we shall see that in the opposite limiting case in which only the host is nonlinear, the ratio A/B for the composite is not necessarily equal to the ratio $A^h/B^h$ for the host.

NONLINEARITY IN THE HOST

We now consider the more complicated situation in which the host material is nonlinear with response coefficients $A^h$ and $B^h$, but the inclusion material is linear. Equations (5.1)–(5.4) are then still valid, but instead of Eqs. (5.5) and (5.6) we have $$p^{NL}(r) = \theta^h(r) p^{NL,h}(r), \quad (6.1)$$

where $\theta^h(\vec{r}) = 1$ if the point $\vec{r}$ is in the host material and 0 if $\vec{r}$ is in an inclusion, and where $$p^{NL,h}(r) = A^h[e(r) \cdot e^*(r)]e(r) + \tfrac{1}{2} B^h[e(r) \cdot e(r)]e^*(r). \quad (6.2)$$

As in section 5, it suffices to estimate $\vec{e}(\vec{r})$ in Eq. (6.2) from the results of a calculation (section 4) performed neglecting the nonlinearity itself. In the linear limit $\vec{p}^s(r) = \vec{p}'(\vec{r})$, where $\vec{p}'(\vec{r})$ vanishes within the host material, so for use in Eq. (6.2) the field $\vec{e}(\vec{r})$ of Eq. (4.1) reduces to $$e(r) = E^c(r) + \int T^c(r - r') \cdot p'(r') dr'. \quad (6.3)$$

Now consider a particular inclusion, centered for simplicity at the origin. In its neighborhood a nonlinear polarization will be induced according to Eqs. (6.1)–(6.3). In evaluating the contribution from the $T^c$ term in Eq. (6.3), we may neglect the contributions from all the other inclusions except the one at the origin, following the discussion in the paragraph following Eq. (4.10). So outside our particular inclusion we have $$e(r) = [0 + a^3 \beta \epsilon^h T(r)] \cdot E^c, \quad (6.4)$$

where we have used Eq. (4.19) for the (linear) dipole moment of the inclusion, and Eq. (4.4c) for the integral over the inclusion. We have assumed we are at distances $r < b << R$ from our particular inclusion, so $T^c$ has been approximated as $T^0$; we shall see shortly that it is only at such distances that we get a significant contribution from the T term in Eq. (6.4) to Eq. (6.2). The fact that $r << R$ has allowed us to treat $\vec{E}^c(\vec{r})$ as essentially uniform $\vec{E}^c \equiv \vec{E}^c(\vec{r}0)$.

Writing the Cartesian components of Eq. (6.4) as $$e_i(r) = [\delta_{ij} + r^{-3} a^3 \beta t_{ij}] E^c_j, \quad (6.5)$$

where repeated indices are to be summed over, and where $$t_{ij} \equiv (3n_i n_j - \delta_{ij}), \quad (6.6)$$

with $\vec{n} \equiv \vec{r}/r$, we can use Eqs. (6.2) and (6.5) in Eq. (6.1) to determine $\vec{p}^{NL}(\vec{r})$ in the neighborhood of our particular inclusion. We find $$p^{NL}(r) = p^{NLu}(r) + p^{NLd}(r), \quad (6.7)$$

where $$p^{NLu}(r) = A^h[E^c \cdot E^{c*}]E^c + \tfrac{1}{2} B^h E^c \cdot E^c]E^{c*}, \quad (6.8)$$

$$p^{NLd}_m(r) = A^h D^{\beta\beta\beta^*}_{mljk}(r) E^c_l E^c_j E^{c*}_k + \tfrac{1}{2} B^h D^{\beta^*\beta\beta}_{mljk}(r) E^{c*}_l E^c_j E^c_k, \quad (6.9)$$

where $D^{\beta\beta\beta^*}{}_{mljk}$ and $D^{\beta^*\beta\beta}{}_{mljk}$ are specified by Eq. (II.11) of Appendix II, and the discussion following Eq. (II.12). Note that $\bar{p}^{NLu}(\bar{r})$ is uniform in the neighborhood of our particular inclusion, while $\bar{p}^{NLd}(\bar{r})$ is a nonlinear polarization that "dresses" the inclusion, and is nonzero only close to it. Of course, there are term $\bar{p}^{NLd}(\bar{r})$ that cancel $\bar{p}^{NLu}(\bar{r})$ when $\bar{r}$ is inside the inclusion (see Eq. II. 11 of Appendix II), since $\bar{p}^{NL}(\bar{r})$ is zero there. Now we put Eq. (6.7) into the third of Eq. (2.12) to determine $\bar{P}^{NL}(e, \text{rar}/r/\,)$. We treat $\bar{E}^c$ as uniform over the range R of $\Delta(\bar{r})$ (recall the discussion preceding Eq. 4.11); adding up the contributions from the D terms inclusion-by-inclusion, and neglecting the variation of over the range of the D's, we find that $$P_m^{NL} = A^h(E^c \cdot E^{c*}) E_m^c + \tfrac{1}{2} B^h[E^c \cdot E^c] E_m^{c*} + \quad (6.10)$$
$$A^h N_{script} \int D^\beta_{mljk}{}^{\beta\beta^*}(r') dr'] E_l^c E_j^c E_k^{c*} +$$
$$\tfrac{1}{2} B^h N_{script} \int D^\beta_{mljk}{}^{*\beta}\beta(r') dr'] E_l^{c*} E_j^c E_k^c,$$

where $N_{script} \equiv f/(4\pi a/3)$ is the number of inclusions per unit volume. The integrals in Eq. (6.10) receive contributions only from terms in the D's that drop off as $r^{-6}$ and $r^{-9}$ for $r < a$; the integrals are evaluated in Appendix II and are given by Eqs. (II.14). Substituting those expressions into Eq. (6.10), and using Eq. (4.17) for $\bar{E}^c$, we find that $$P^{NL} = (E \cdot E^*)E \left[ A^h(1-f) + fA^h\left(\frac{11}{5}|\beta|^2 + \tfrac{1}{5}\beta^2 + \tfrac{1}{10}\beta|\beta|^2\right) + \right.$$
$$\left. fB^h\left(\frac{12}{5}\right)|\beta|^2 + \tfrac{3}{5}\beta[\beta]^2\right)\right]\left|\frac{\epsilon + 2\epsilon^h}{3\epsilon^h}\right|^2 \left(\frac{\epsilon + 2\epsilon^h}{3\epsilon^h}\right) +$$
$$(E \cdot E)E^* \left[ B^h(1-f) + fB^h\left(2\beta^2 - \tfrac{4}{5}|\beta|^2 - \tfrac{1}{5}\beta|\beta|^2\right) + \right.$$
$$\left. fA^h\left(\tfrac{3}{5}\beta^2 + \tfrac{3}{5}|\beta|^2 + \tfrac{3}{10}\beta|\beta|^2\right)\right]\left|\frac{\epsilon + 2\epsilon^h}{3\epsilon^h}\right|^2 \left(\frac{\epsilon + 2\epsilon^h}{3\epsilon^h}\right) \quad (6.11)$$

where $\beta$ is given by Eq. (4.7) and $\epsilon$ by Eq. (4.16). The terms $A^h(1-f)$ and $B^h(1-f)$ describe the nonlinear polarization that would result if all of the host material (fill fraction $(1-f)$) responded nonlinearly only to the cavity field; the other terms result from the "dressings of nonlinear polarization" induced above and beyond this in the neighborhood of each inclusion by its own dipole field.

To complete our expression (5.3) for the displacement field $\bar{D}(\bar{r})$, and subsequently to identify the effective-medium nonlinear response coefficients A and B (Eq. 5.4), we must now find $\bar{P}'(\bar{r})$. Since $\bar{p}'(\bar{r})$ is nonzero only in the inclusions (see Eq. 2.6), we return to the consideration of one particular inclusion as discussed at the start of this section. For points $\bar{r}$ at $r < a$ we have $$p'(r) = \frac{\epsilon^i - \epsilon^h}{4\pi}\left[E^c - \frac{4\pi}{3\epsilon^h}p'(r) + \int T^c(r-r') \cdot p^s(r') dr'\right], \quad (6.12)$$

where we have used Eqs. (2.6), (2.8), and (4.1), as well as the fact that $\bar{p}^{NL}(\bar{r}) = 0$ inside the inclusion; $\bar{E}^c$ of course is given by (see Eq. 4.2)

$$E^c = E + \frac{4\pi}{3\epsilon^h}P + \frac{4\pi}{3\epsilon^h}P^{NL}, \quad (6.13)$$

where we again neglect the variation of $\bar{E}^c$ over our particular inclusion. The integral in Eq. (6.12) involves $\bar{p}^s(\bar{r}) = \bar{p}^{NL}(\bar{r}) + \bar{p}'(\bar{r})$. Following the arguments given after Eq. (4.10), the contribution from $\bar{p}'(\bar{r})$ is negligible and, arguing similarly with $\bar{p}^{NL}(\bar{r})$ we can neglect the contributions from the dressings of nonlinear polarizations (see the discussion after Eq. 6.11) surrounding all inclusions other than the particular one under consideration. That is, the $\bar{p}^s(\bar{r}')$ in Eq. (6.12) can be replaced by the $\bar{p}^{NL}(\bar{r}')$ given by Eq. (6.7). Doing this, and integrating Eq. (6.12) over our particular inclusion we find $$\mu' = \frac{a^3}{3}(\epsilon^i - \epsilon^h)\left[E^c - \frac{\mu'}{a^3\epsilon^h} + E_{script}\right], \text{ where} \quad (6.14)$$

$$\mu' = \int_{sphere} p'(r) dr \quad (6.15)$$

is the dipole moment associated with the $\bar{p}'(\bar{r})$ of our particular inclusion, and where $$\bar{E}_{script} = \int T(\bar{r}') \cdot \bar{p}^{NL}(\bar{r}') d\bar{r}', \quad (6.16)$$

with $\bar{p}^{NL}(\bar{r}')$ given by Eq. (6.7). In arriving at Eqs. (6.14) and (6.16) we have omitted the cut-off function $c(r)$ from $T^c$. For $\bar{p}^{NLu}$ it is not needed, as long as we integrate Eq. (6.16) over solid angle first, since $\bar{p}^{NLu}$ is uniform; and $\bar{p}^{NLd}$ is confined to the neighborhood of the inclusion, so a cut-off function of range $R >> b$ is not required. In arriving at the form of Eq. (6.16) we have also been able to use Eq. (4.4c), since $\bar{p}^{NL}(\bar{r}')$ vanishes for points $\bar{r}'$ note also that $T(-\bar{r}) = T(\bar{r}')$. As usual, we have neglected the variation of macroscopic fields over distances on the order of $a << R$. Putting Eqs. (3.5) and (6.7) in Eq. (6.16) we may evaluate $\bar{E}_{script}$; we find $$\epsilon^h E_p^{script}/4\pi = A^h[\int B^\beta_{pljk}{}^{\beta\beta^*}(r') dr'] E_l E_j E_k^* \left|\frac{\epsilon + 2\epsilon^h}{3\epsilon^h}\right|^2 \left(\frac{\epsilon + 2\epsilon^h}{3\epsilon^h}\right) + \quad (6.17)$$

-continued $$\tfrac{1}{2} B^h [\int B^{\beta\beta*}_{pljk}{}^{\beta\beta}(r')dr']E_l^* E_j E_k \left|\frac{\epsilon + 2\epsilon^h}{3\epsilon^h}\right|^2 \left(\frac{\epsilon + 2\epsilon^h}{3\epsilon^h}\right),$$

where the definitions of the integrals appearing in Eq. (6.17) are given in Appendix II; the values of the integrals are also worked out there (Eq. II.13). With these results, we find $$\epsilon^h E_{script}/4\pi = (E \cdot E^*)E\left[A^h\left(\tfrac{2}{3}\beta + \tfrac{1}{15}(\beta + \beta^*) + \tfrac{1}{30}(\beta^2 + 2|\beta|^2) + \tfrac{7}{15}\beta|\beta|^2\right) + \right.$$

$$\tfrac{1}{2}B^h\left(\tfrac{4}{5}\beta + \tfrac{1}{5}(\beta^2 + 2|\beta|^2) + \tfrac{2}{15}\beta|\beta|^2\right)\bigg]\left|\frac{\epsilon + 2\epsilon^h}{3\epsilon^h}\right|^2 \left(\frac{\epsilon + 2\epsilon^h}{3\epsilon^h}\right) +$$

$$(E \cdot E)E^*\left[A^h\left(\tfrac{1}{5}(\beta + \beta^*) + \tfrac{1}{10}(\beta^2 + 2|\beta|^2) + \tfrac{1}{15}\beta|\beta|^2\right) + \right.$$

$$\left.\tfrac{1}{2}B^h\left(\tfrac{2}{3}\beta^* - \tfrac{4}{15}\beta - \tfrac{1}{15}(\beta^2 + 2|\beta|^2) + \tfrac{2}{5}\beta|\beta|^2\right)\right]\left|\frac{\epsilon + 2\epsilon^h}{3\epsilon^h}\right|^2 \left(\frac{\epsilon + 2\epsilon^h}{3\epsilon^h}\right).$$

We now determine $\vec{P}'(\vec{r})$ by averaging $\vec{p}'(\vec{r})$. Neglecting the variation of $\Delta(\vec{r})$ over distances on the order a, we find that the integral (2.12) reduces to essentially a sum of the dipole moments $\mu'$. Using Eq. (6.14) and neglecting as usual the variation of macroscopic fields over distances of the order of R, we find $$4\pi P'(r) = 3\epsilon^h \beta f[E^c(r) + E_{script}(r)], \quad (6.19)$$

(contrast with Eq. 4.11), were now $\vec{E}_{script}(\vec{r}')$ is given as a function of $\vec{r}$ by Eq. (6.18). Putting Eq. (6.13) into Eq. (6.19) we find that we may write $$P(r) + P^{NL}(r) = \frac{\epsilon - \epsilon^h}{4\pi} E(r) + \quad (6.20)$$

$$\frac{\epsilon + 2\epsilon^h}{3\epsilon^h} P^{NL}(r) + \frac{\epsilon + 2\epsilon^h}{4\pi} \beta f E_{script}(r).$$

where $\epsilon$ is given by Eq. (4.16), and we have used Eq. (4.17) for $\beta$; using Eq. (6.20) in Eq. (5.3) we can then write $$D(r) = \epsilon E(r) + D^{NL}(r), \quad (6.21)$$

where $$D^{NL}(r) = \frac{\epsilon + 2\epsilon^h}{3\epsilon^h} [4\pi P^{NL}(r)] + (\epsilon + 2\epsilon^h)\beta f E_{script}(r). \quad (6.22)$$

Substituting Eqs. (6.11) and (6.18) into (6.22) and comparing with Eq. (5.4), we may identify the nonlinear response coefficients of the effective medium. We find $$A = \left|\frac{\epsilon + 2\epsilon^h}{3\epsilon^h}\right|^2 \left(\frac{\epsilon + 2\epsilon^h}{3\epsilon^h}\right)^2 \left[(1 - f)A^h + \right. \quad (6.23)$$

$$f\left(\tfrac{7}{5}\beta^2|\beta|^2 + \tfrac{3}{10}\beta|\beta|^2 + \tfrac{1}{10}\beta^3 + \tfrac{12}{5}|\beta|^2 + \right.$$

$$\left.\tfrac{12}{5}\beta^2\right)A^h + f\left(\tfrac{2}{5}\beta^2|\beta|^2 + \tfrac{9}{5}\beta|\beta|^2 + \right.$$

$$\left.\tfrac{3}{5}\beta^3 + \tfrac{12}{5}|\beta|^2 + \tfrac{12}{5}\beta^2\right)\tfrac{1}{2}B^h\bigg], \quad (6.18)$$

$$B = \left|\frac{\epsilon + 2\epsilon^h}{3\epsilon^h}\right|^2 \left(\frac{\epsilon + 2\epsilon^h}{3\epsilon^h}\right)^2 \left[(1 - f)B^h + \right.$$

$$f\left(\tfrac{6}{5}\beta^2|\beta|^2 - \tfrac{3}{5}\beta|\beta|^2 - \tfrac{1}{5}\beta^3 + \tfrac{6}{5}|\beta|^2 + \right.$$

$$\left.\tfrac{6}{5}\beta^2\right)B^h + f\left(\tfrac{1}{5}\beta^2|\beta|^2 + \tfrac{9}{10}\beta|\beta|^2 + \right.$$

$$\left.\tfrac{3}{10}\beta^3 + \tfrac{6}{5}|\beta|^2 + \tfrac{6}{5}\beta^2\right)2A^h\bigg].$$

As in the results of the preceding section, there are four "local field correction factors" which appear in the expressions above. They are different here than in the preceding section, because they apply to the local field in the host (see Eq. 4.17) rather than in the inclusion (see Eq. 4.18). Beyond that, the results for the nonlinearity in the host are much more complicated because, as is clear from comparing the derivations in sections 5 and 6, the mesoscopic fields are much more complicated in the host. In particular, while if the nonlinearity is in the inclusions we have $A/B = A^i/B^i$, we do not have $A/B = A^h/B^h$ if the nonlinearity is in the host. Plots of different cases which apply the results of Eqs. (6.23) are shown in FIGS. 4 and 5, (a), (b), (c).

Figure 4:
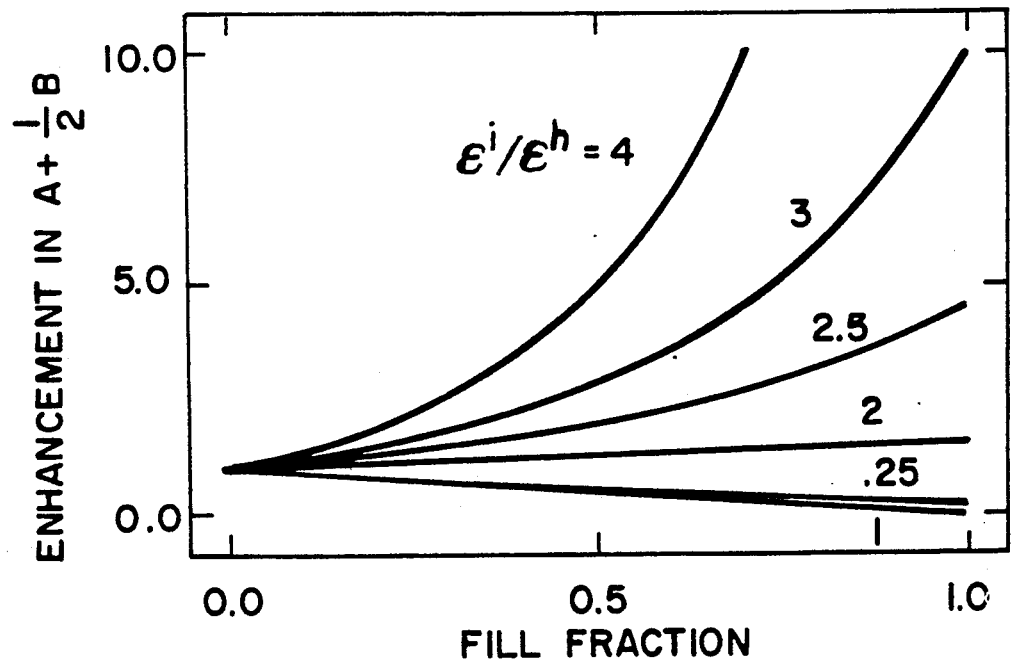
FIG. 4 is a plot showing the enhancement in $A+(\frac{1}{3})B$ versus the fill factor f of the inclusion material for several values of the ratio $\epsilon_i/\epsilon_h$ (the linear dielective constant of the inclusions $\epsilon_i$ to the linear dielective constant of the host component $\epsilon_h$) of linear susceptibilities for the case in which the host responds nonlinearly and the inclusions respond linearly.

In FIG. 4 we plot the enhancement in the quantity $A + (\tfrac{1}{2})B$ [i.e. we plot $(A + (\tfrac{1}{2})B)/(A^h + (\tfrac{1}{2})B^h)$] as a function of the fill fraction f of inclusion material for several values of the ratio $\epsilon^i/\epsilon^h$ of linear dielectric constants. We have the quantity $A + (\tfrac{1}{2})B$ because it is proportional to the nonlinear refractive index experienced by linear polarized light; as mentioned above, in general the enhancement in A is different from the enhancement in B. Moreover, as can be verified by careful examination of Eqs. (6.23). The enhancement in $A + (\tfrac{1}{2})B$ for a given value of f does not depend upon the ratio $B^h/A^h$ of nonlinear coefficients of the host material; conversely, the enhancement in A or B separately does depend on the ratio $B^h/A^h$. For the case in which the inclusion and host have the same value of the dielectric constant, we see that $A+(\frac{1}{3})B$ decreases linearly to zero as f increases from zero to one. The origin of this behavior is simply that the amount of nonlinear material decreases as the fraction of inclusion material increases. Nonetheless, for $\epsilon^i/\epsilon^h$ greater than one and preferably greater than approximately two, we find that the quantity $A+(\frac{1}{3})B$ increases as the fill fraction of (linear) inclusion material increases. This effect occurs because the presence of the inclusion material modifies the electric field distribution within the composite material in such a manner that the spatially averaged cube of the electric field within the host material is significantly increased.

Figure 5A:
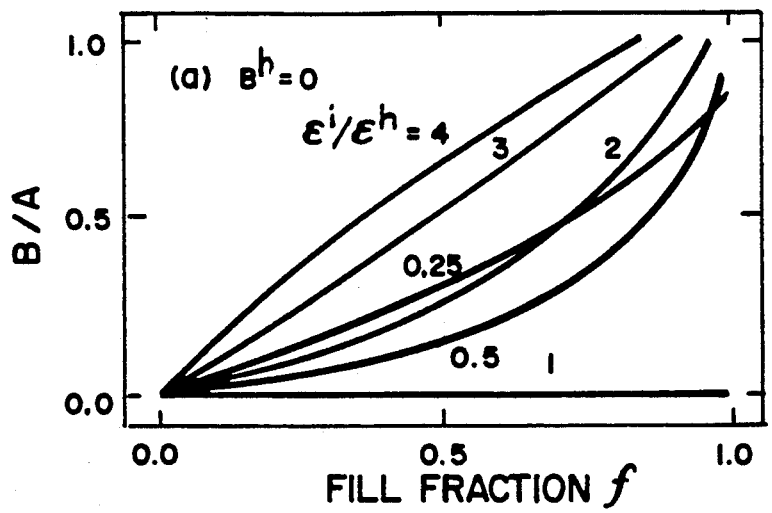
FIGS. 5a, b and c are three plots of the ratio B/A of nonlinear coefficients of the composite material system versus fill factor f of the inclusion component for several values of the ratio $\epsilon_i/\epsilon_h$ of linear dielective constants for the case in which the inclusions respond linearly and the host responds nonlinearly with different host material nonlinear coefficient relationships, $B_h=0$ in plot (a), $B_h=A_h$ in plot (b) and $B_h=6A_h$ in plot (c).
Figure 5B:
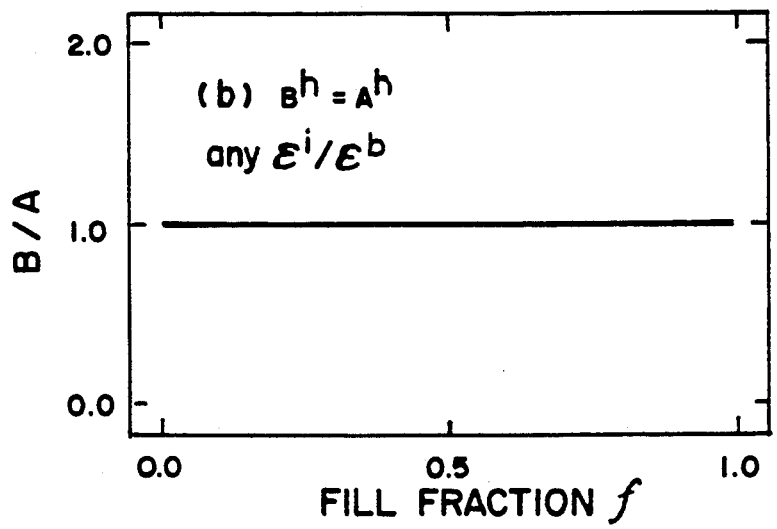
Figure 5C:
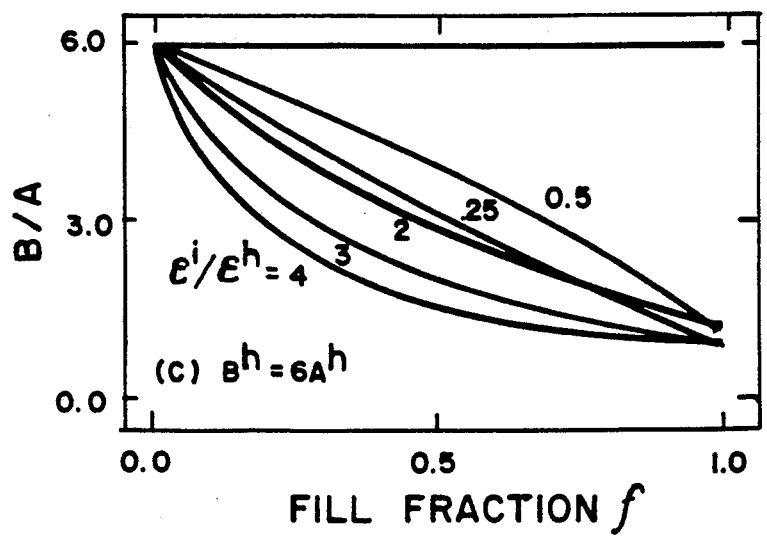

Some of the tensor properties of the nonlinear response of the composite material are shown in FIGS. 5a, b and c. In each graph, the ratio B/A for the composite is plotted as a function of the fill fraction f for several values of the ratio $\epsilon^i/\epsilon^h$ of linear dielectric constants. FIG. 5a, FIG. 5b and FIG. 5c refer respectively to the cases $B^h=0$, $B^h/A^h=1$, and $B^h/A^h=6$, and correspond physically to a nonlinear response dominated by electrostriction ($B^h=0$), electronic response in the low-frequency limit ($B^h/A^h=1$), and molecular orientation ($B^h/A^h=6$). From part (a) we see that, even when $B^h$ vanishes, the composite can possess nonlinear coefficients A and B that are comparable in size. From part (b) we see that, for the special case $B^h/A^h=1$, the ratio of nonlinear coefficients of the composite is equal to that of the host for any value of f.

SUMMARY

In summary, we have generalized the Maxwell Garnett Theory of the optical response of composite materials by allowing either or both constituents of the material (the host component and the inclusion component) to possess a third-order nonlinear susceptibility. Equations (5.15) and (6.23) respectively give the key results of our calculation for cases in which only the inclusion material and in which only the host material is nonlinear. When both components respond nonlinearly, the effective values of the nonlinear susceptibilities A and B are obtained by summing the two contributions given by Eqs. (5.15) and (6.23). In these equations, A and B are defined by Eq. (5.4), $A^i$ and $B^i$ by Eq. (5.6), $A^h$ and $B^h$ by Eq. (6.2), $\epsilon$ by Eq. (4.16) and $\beta$ by Eq. (4.7). Our treatment takes full account of the tensor nature of the nonlinear interaction under the assumptions that each component is optically isotropic and that the composite is macroscopically isotropic. For the case in which only the inclusion material is nonlinear, our results are consistent with those set forth in the articles by D. Rich et al., G. S. Agarwal et al., and J. W. Haus et al., referenced above. For the case in which the host material is nonlinear, the nonlinear susceptibilities A and B for the composite can be considerably larger than those of the host material itself; moreover, the ratio B/A for the composite can be very different from that of the host. We note that in all of the examples presented we have assumed that both constituents are lossless and thus that the parameters $\epsilon^i$, $\epsilon^h$, $A^i$, $B^i$, $A^h$, and $B^h$ are all real. Nonetheless, the formulas presented here are correct even in the more general case where those parameters are complex.

SYSTEMS DEVICES AND METHODS

Systems in which nonlinear interactions occur in accordance with the invention utilize the material system discussed above and means for applying optical radiation to establish a field in the material system (the body of composite material). The field is applied by propagating a laser beam or beams so that they are incident on the body, and preferably are transmitted therethrough. Configurations of the system for different nonlinear optical interactions are described in Section 1.2 of the text by Robert W. Boyd referenced above.

For second harmonic generation a beam of frequency $\omega$ propagates through the body which is a composite material system having second-order nonlinear susceptibility, $\chi^{(2)}$. For some frequency generation two beams of different frequencies $\omega_1$ and $\omega_2$ are applied to the body having the $\chi^{(2)}$ nonlinear susceptibility. Similarly, two beams of different frequency produce an output beam of difference frequency when the intensity of the $\omega_1$ beam exceeds that of the $\chi_2$ beam. The sum frequencies are provided when the $\omega_1$ and $\omega_2$ beams are of approximately equal intensity. Optical parametric oscillation is obtained by containing the body of nonlinear material in a cavity and pumping the body with a laser beam. The refractive index changes as a function of the intensity of the incident beam and provides self-focusing (a lens) in the body of composite material.

Third order material, $\chi^{(3)}$, is used for third harmonic generation and also when a plurality of beams are applied so as to obtain sum or difference frequency generation depending upon the relative intensities of the incident beams. Photonic devices, for example an optically bistable device, is obtained by utilizing the body as a saturable absorber. Other photonic and electro-optic devices and systems are obtained by utilizing the body within a control electric field as discussed in Chapter 10 of the above-referenced text by Robert W. Boyd. In all cases the efficiency and the nonlinear interactions in the body are enhanced because of the enhanced susceptibility obtained by virtue of the host being of material having nonlinear optical susceptibility (a nonlinear response to the amplitude (intensity) of the incident laser beam or beams).

MATERIAL SYSTEMS

Material systems embodying the invention have the topology of inclusion particles imbedded in the host. Alternatively, the systems may have two interdispersed components. Where the inclusion particles are provided by a matrix containing the nonlinear component, the nonlinear component then acts as the host in the case where the inclusion particles are imbedded in the host (FIG. 1).

In the following discussion, systems which provide enhanced third-order susceptibility ($\chi^{(3)}$) will first be discussed, then systems which provide enhanced second-order nonlinear susceptibility ($\chi^{(2)}$) will be discussed. The first system consists of particles suspended in carbon disulfide ($CS_2$). The particles may be titania ($TiO_2$). Titania is presently preferred because of its high refractive index (2.8) and because it may be precipitated as particles in the preferred particle size range (the order of 50 Angstroms). Carbon disulfide is preferable because of its low refractive index (1.6) and because it is a well accepted nonlinear optical material. The host and particles thus differ significantly in their respective refractive indices. Titania has nonlinear susceptibility characteristics.

The particles may alternatively be diamond particles. Semiconductor microcrystallites may also be used. It is desirable to use semiconductors, such as cadmium sulfide at photon energies (wavelengths of the incident beam) well below the band gap energy of the semiconductor. For example, cadmium sulfide microcrystallites are desirably used when the beam is in the infrared frequency range because band gap energy corresponds to a wavelength of approximately 700 Angstrom units and the near infrared is from approximately 1.3 to 1.55 micrometers in wavelength. There the semiconductor is transparent and lossless to the incident irradiation.

Material systems which emphasize the third-order nonlinearities or susceptibilities utilize hosts which are isotropic. Material systems which emphasize the second-order nonlinear response or susceptibility are desirably anisotropic. A preferred host material for systems operating in accordance with third-order nonlinear optical interactions may be plastics and polymers. Conjugated polymers having small linear refractive indices are preferred. An especially preferred polymer is polydiacetylene. The chemistry of such polymers and various types of conjugated polymers are described in the text by P. N. Prasad and D. J. Williams, *Introduction to Nonlinear Optical Effects in Molecules and Polymers*, John Wiley & Sons, Inc., New York (1991). A listing of such polymers is found in Table 10.02 in that text. In addition to polydiacetylenes, other polymers which may be used as host components of the material system are poly-*p*-phenylene vinylenes, polyacetylene, polythiophene, polyimides, phthalocyaine, polysilanes and ferocene.

In addition to carbon disulfide, other liquids (at room temperature) which exhibit third-order nonlinear response are listed in Table 10.1 of the above-referenced text. They include benzene, allo-ocimine, trans-retiliol, nitrobenzene, iodobenzene, pyridine, and thiophene.

The particles may be suspended in the host, especially in the case of plastics while the plastic is in its liquid state and the particles are held in place in the plastic when it cures to solid state. The composite may be in the form of a colloid. Then the particles are suspended in the nonlinear host medium. It is possible to use metal particles (gold, silver or platinum) in a nonlinear host medium in order to provide nonlinearity. Then absorption in the particle of the illumination must be tolerated.

The interdispersed topology may be implemented using porous glass or glass which is formed from sol gel media. One porous glass is sold by Corning Glass Company of Corning, N.Y. under the trademark Vycor. The host is introduced, as by capillary action, into the pores and is interdispersed with the material of the pores which then provide the effect of the particles.

Second-order nonlinear systems preferably consist of poled polymers which are cured in the presence of an electric field. Such polymers are discussed in the above-referenced text by Prasad and Williams and their chemistry and physics is described in Section 4.2 of the text. The polymers may be constructed as multi-layers with the particles distributed between the layers. Formation of multi-layers from plastic and other polymeric materials is known in the art and has been used to provide Langmuir-Blodgett films. See Section 4.4 of the Prasad and Williams text. Poled polymers are described in Section 7.4 of the text. Suitable material for forming poled polymers are p-(dimethylamino)-p*-nitrostilbene, polystyrene, PMMA, parachlorosubstituted polymer, copolymers with methyl methacrylate or side chain substituted methacrylates, acrylic polymers, diaminodicyanoquinodimethanes polycarbonate with thiapyrylium disalt, and polyethyleneoxide and p-nitroaniline dissolved in poly($\epsilon$-caprolactone). The structural formulas and methods for producing these materials are found in the Prasad and Williams text or references cited therein.

From the foregoing description, it will be apparent that there has been provided significant improvements in nonlinear optics and particularly in systems, devices and methods of processing optical radiation (beams and signals) which exhibit enhanced nonlinear response to the radiation. Variations and modifications in the herein described systems, devices and methods, within the scope of the invention, will undoubtedly suggest themselves to those skilled in the art. Accordingly, the foregoing description should be taken as illustrative and not in a limiting sense.

APPENDIX I

In this appendix we derive a relation between the electric field $\vec{e}(\vec{r})$ satisfying the Maxwell equations $$\nabla \cdot [\epsilon e(r)] = -4\pi \nabla \cdot p(r)$$

$$\nabla \cdot b(r) = 0$$

$$\nabla \times e(r) - i\omega b(r) = 0$$

$$\nabla \times b(r) + i\omega \epsilon e(r) = -4\pi i\omega p(r), \tag{I.1}$$

and its macroscopic average $\vec{E}(\vec{r})$, $$E(r) = \int \Delta(r - r') e(r') dr'. \tag{I.2}$$

Equations (I.1) are identical to Eqs. (2.7), with $\epsilon^h$ and $\vec{p}^s(\vec{r})$ replaced by $\epsilon$ and $\vec{p}(\vec{r})$ respectively to simplify the notation; $\epsilon$ is taken to be uniform and, as before, $\omega \equiv \omega/c$. For most of this appendix (up to and including Eq. I.43) we need assume only that $\Delta(\vec{r})$ is a spherically symmetric function, $\Delta(\vec{r}) = \Delta(r)$, where $r = |\vec{r}|$, that vanishes sufficiently rapidly as $r \to \infty$.

A relation similar to the one we find here was considered earlier [14], where we took $\epsilon = 1$ and assumed that $\vec{p}(\vec{r})$ was a sum of Dirac delta functions. Here we are interested in $\epsilon \neq 1$, and in a $\vec{p}(\vec{r})$ that is continuous except for stepwise discontinuities at the surfaces of our inclusions; in the usual way $\vec{p}(\vec{r})$ is assumed to vanish as $r \to \infty$, and we are interested in solutions of Eqs. (I.1) for which the particular component satisfies the usual outgoing radiation condition [17].

We begin with two forms of the solution to Eqs. (I.1). The first is obtained by noting that those equations can be written as $$\nabla \cdot [\epsilon e(r)] = -4\pi \nabla \cdot p(r) \tag{I.3}$$

$$\nabla \cdot [\sqrt{\epsilon}\, b(r)] = 0$$

$$\nabla \times [\epsilon e(r)] - ik[\sqrt{\epsilon}\, b(r)] = 0$$

$$\nabla \times [\sqrt{\epsilon}\, b(r)] + ik[\epsilon e(r)] = -4\pi ik p(r),$$

where $k \equiv \sqrt{\epsilon \omega}$ is taken to have Im $k \geq 0$, Re $k > 0$ if Im $k = 0$. Thus the solutions for $\epsilon \vec{e}(\vec{r})$, $\sqrt{\epsilon}\vec{b}(\vec{r})$ may be recovered, upon replacement of $\omega$ by $k$, from the solutions in the $\epsilon = 1$ limit. The latter solutions are well-known [18], and so we identify from the solution to Eq. (I.1) for $\vec{e}(\vec{r})$ as $$e(r) = \lim_{\eta \to 0} \int_{\eta(r)} F(r-r') \cdot p(r')dr' - \frac{4\pi}{3\epsilon} p(r), \quad (I.4)$$

with $$F(r) = \epsilon^{-1} [\nabla\nabla + U k^2] \frac{e^{ikr}}{r}, \quad (I.5)$$

where U is the unit dyadic; in component form $$F_{ij}(r) = \epsilon^{-1} \left[ \frac{\partial}{\partial x_i} \frac{\partial}{\partial x_j} + \delta_{ij} k^2 \right] \frac{e^{ikr}}{r}, \quad (I.6)$$

where the subscripts label Cartesian components. The notation in Eq. (I.4) indicates that a small sphere of radius $\eta$, centered at $\vec{r}' = \vec{r}$, is to be excluded from the $\vec{r}'$ integration, and then at the end of the calculation the radius $\eta$ of the excluded sphere is to be allowed to approach zero. This "excluded sphere" is necessary to make Eq. (I.4) even unambiguous [19], since $F(\vec{r})$ diverges (as $r^{-3}$) as $r \to 0$. A convenient shorthand is to rewrite Eq. (I.4) as $$e(r) = \int F^0(r-r') \cdot p(r')dr' - \frac{4\pi}{3\epsilon} p(r), \quad (I.7)$$

where $$F^0(r) = F(r) \quad r > \eta$$
$$= 0, \quad r < \eta \quad (I.8)$$
$$\eta \to 0 \text{ after evaluating the integral.}$$

The expression (I.4) or (I.7) is valid at all points $\vec{r}$ except those (a set of measure zero) where $\vec{p}(\vec{r})$ is changing discontinuously; at such points $\vec{e}(\vec{r})$ is itself varying discontinuously in a steplike manner, as described by Eq. (I.4) or (I.7) as $\vec{r}$ moves from one side of the surface to the other. Finally, we note that we have omitted any homogeneous solution of Eqs. (I.1) in writing down Eq. (I.4). We continue to omit such homogeneous solutions until later in this appendix (see Eq. I.44).

A second form of the particular solution to Eq. (I.1) may be obtained by taking the curl of the third of those equations, using the identity curl curl = grad div $-\nabla^2$, , and the first of Eqs. (I.1) to find $$[\nabla^2 + k^2]e(r) = -4\pi q(r), \quad (I.9)$$

where $$q(r) = \omega^2 p(r) + \epsilon^{-1} \nabla (\nabla \cdot p(r)). \quad (I.10)$$

The particular solution to Eq. (I.9) is well known [20], $$e(r) = \int \frac{e^{ik(r-r')}}{|r-r'|} q(r')dr'. \quad (I.11)$$

Strictly speaking, an excluded sphere centered at $\vec{r}' = \vec{r}$ should be specified in Eq. (I.11), since the Green function $|r-\vec{r}'|^{-1} \exp(ik|\vec{r}-\vec{r}'|)$ is undefined as $r' \to r$ [16]. But because the divergence is in practice masked by the volume element $d\vec{r}$, the omission of the excluded volume here usually does not lead to difficulties. We proceed now by using Eq. (I.11) to find an expression for $\vec{E}(\vec{r})$.

Using Eq. (I.11) in Eq. (I.2), we find $$E(r) = \int I(k;r-r')q(r')dr'. \quad (I.12)$$

where $$I(k;r) = \int \Delta(r') \frac{e^{ik|r-r'|}}{|r-r'|} dr'. \quad (I.13)$$

Using the Green function expansion [21]

$$\frac{e^{ik|r-r'|}}{|r-r'|} = 4\pi ik \sum_{lm} j_l(kr_<) h_l^{(1)}(kr_>) Y_{lm}^*(\theta',\phi') Y_{lm}(\theta,\phi), \quad (I.14)$$

where $r_<$ and $R_>$ are respectively the lesser and greater of r and r', the $Y_{lm}$ are the spherical harmonics, and $j_l$ and $h^{(1)}_l$ are respectively the $l^{th}$ order spherical Bessel and Hankel functions of the first kind, we find $$I(k;r) = 4\pi ik\, h_o^{(1)}(kr) \int_{r'=0}^{r} \Delta(r') j_o(kr')(r')^2 dr' + \quad (I.15)$$
$$4\pi ik\, j_o(kr) \int_{r'=r}^{\infty} \Delta(r') h_o^{(1)}(kr')(r')^2 dr',$$

which shows that $I(k;\vec{r})$ depends only on k and $r = |\vec{r}|$. Writing the first integral as the difference between an integral over all r' and one between r and $\infty$, we use $h_o^{(1)} = (ikr)^{-1} \exp(ikr)$ to find $$I(k;r) = \Delta(k) \frac{e^{ikr}}{r} + \tilde{I}(k;r), \quad (I.16)$$

where $$\Delta(k) = 4\pi \int_o^{\infty} r^2 \Delta(r) j_o(kr)dr = \int \Delta(r) e^{ikn\cdot r} dr, \quad (I.17)$$

with n a unit vector in an arbitrary direction, and $$\tilde{I}(k;r) = 4\pi ik\, j_o(kr) \int_{r'=r}^{\infty} \Delta(r') h_o^{(1)}(kr')(r')^2 dr' - \quad (I.18)$$
$$4\pi ik\, h_o^{(1)}(kr) \int_{r'=r}^{\infty} \Delta(r') j_o(kr')(r')^2 dr'$$
$$= k[n_o(kr) \Delta_1(k;r) - j_o(kr) \Delta_2(k;r)]$$

where $$\Delta_1(k;r) = 4\pi \int_{r'=r}^{\infty} \Delta(r') j_o(kr')(r')^2 dr' \quad (I.19)$$

$$\Delta_2(k;r) = 4\pi \int_{r'=r}^{\infty} \Delta(r') n_o(kr')(r')^2 dr'.$$

The second form of Eq. (I-18) is obtained by using $h_o^{(1)}(x) = j_o(x) + in_o(x)$, where $n_o(x)$ is the zeroth-order spherical Bessel function of the second kind; it demonstrates that $\tilde{I}(k;r)$ is purely real.

Inserting Eq. (I-16) into Eq. (I.12) we find that $$E(r) = \Delta(k) \int \frac{e^{ik|r-r'|}}{|r-r'|} q(r')dr' + \int \tilde{I}(k;r-r')q(r')dr'. \quad (I.20)$$

It is now convenient, for a given field point $\vec{r}$, to write $$p(r') = p^>(r') + p^<(r'), \quad (I.21)$$

where $$p^>(r') = p(r') \text{ if } |r - r'| > \eta \quad (I.22)$$
$$= 0 \text{ if } |r - r'| < \eta,$$

and where for the moment $\eta$ is an arbitrary positive number. We then put $$q^>(r') = \omega^2 p^>(r') + \epsilon^{-1} \nabla'(\nabla' \cdot p^>(r')) \quad (I.23)$$

$$e^>(r) = \int \frac{e^{ik|r-r'|}}{|r-r'|} q^>(r') dr'$$

$$E^>(r) = \Delta(k) \int \frac{e^{ik|r-r'|}}{|r-r'|} q^>(r') dr' + \int I(k; r - r') q^>(r') dr',$$

and likewise for $\vec{q}^<(\vec{r}')$, $\vec{e}^<(\vec{r})$, $\vec{E}^<(\vec{r})$; here $\nabla' \equiv \partial/\partial \vec{r}'$. Note that $\vec{q}^<(\vec{r}')$ and $\vec{q}^>(\vec{r}')$ are both singular $|\vec{r}-\vec{r}'| = \eta$, although their sum is not. Nonetheless, since $\vec{p}^>(\vec{r}')$ vanishes at $\vec{r}' = \vec{r}$, we may insert the first of Eq. (I.23) into the first integral in the third of Eqs. (I.23) and perform two partial integrations. The result is $$E^>(r) = \Delta(k) \int F(r-r') \cdot p^>(r') dr' + E^{(1)}(r) + E^{(2)}(r) \quad (I.24)$$

where $$E^{(1)}(r) = \epsilon^{-1} \int I(k; r-r') \nabla'(\nabla' \cdot p^>(r')) dr'$$

$$E^{(2)}(r) = \omega^2 \int I(k; r-r') p^>(r') dr' \quad (I.25)$$

and the F in Eq. (I.24) is given by Eq. (I.5). We next partially integrate the express $\vec{E}^{(1)}(\vec{r})$ twice, again using the fact that $\vec{p}^>(\vec{r}')$, and $\nabla' \cdot \vec{p}^>(\vec{r}')$, vanish at $\vec{r}' = \vec{r}$. The first partial integration yields $$\vec{E}^{(1)}(r) = \epsilon^{-1} \int \nabla I(k; r-r') (\nabla' \cdot p^>(r')) dr' \quad (I.26)$$

using $\nabla' I(k; r-r') = -\nabla I(k; r-r')$. From Eq. (I.18) we find $$\nabla I(k;r) = r \frac{\partial I(k;r)}{\partial r} = r f(k;r) \equiv V(k;r), \quad (I.27)$$

where $$f(k;r) = k^2[n_o'(kr)\Delta_1(kr) - j_o'(kr)\Delta_2(kr)], \quad (I.28)$$

with $n'_o(x) \equiv dn_o(x)/dx$ and $j'_o \equiv dj_o(x)/dx$, and where we have used $$\frac{\partial \Delta_1(k;r)}{\partial r} = -4\pi r^2 \Delta(r) j_o(kr) \quad (I.29)$$

$$\frac{\partial \Delta_2(k;r)}{\partial r} = -4\pi r^2 \Delta(r) n_o(kr), \quad$$

(see Eqs. 1.19). The second partial integration gives $$E^{(1)}(r) = \epsilon^{-1} \int (p^>(r') \cdot \nabla) \nabla(k; r-r'). \quad (I.30)$$

To evaluate this expression we need the components $$\frac{\partial V(k;r)}{\partial x_j} = \frac{\partial}{\partial x_j}\left[\frac{x_i}{r} f(k;r)\right] = \left[\frac{\delta_{ij}}{r} - \frac{x_i x_j}{r^3}\right] f(k;r) + \quad (I.31)$$

$$\frac{x_i x_j}{r^2} \frac{\partial f(k;r)}{\partial r}.$$

-continued

We find $$\frac{\partial f(k;r)}{\partial r} = g(k;r) - 4\pi\Delta(r), \quad (I.32)$$

where $$g(k;r) = k^3[n_o''(kr)\Delta_1(k;r) - j_o''(kr)\Delta_2(k;r)], \quad (I.33)$$

with $n''_o(x) = dn'_o(x)/dx$, etc.; we have used Eq. (I.28) and the Wronskian relation $j_o(x)n'_o(x) - j'_o(x)n_o(x0 = x^{-2}$. Using Eq. (I-32) in Eq. (I-31) we write $$\frac{\partial V_i(k;r)}{\partial x_j} = \frac{4\pi}{3} \delta_{ij}\Delta(r) + K_{ij}(k;r), \quad (I.34)$$

where $$K_{ij}(k;r) = \delta_{ij}\left[\frac{f(k;r)}{r} + \frac{4\pi}{3}\Delta(r)\right] + \quad (I.35)$$

$$\frac{x_i x_j}{r^2}\left[g(k;r) - \frac{f(k;r)}{r} - 4\pi\Delta(r)\right].$$

and so $$E^{(1)}(r) = -\frac{4\pi}{3\epsilon} P^>(r) + \epsilon^{-1} \int K(k; r-r') \cdot p^>(r') dr', \quad (I.36)$$

where $$P^>(r) = \int \Delta(r-r') p^>(r') dr'. \quad (I.37)$$

Using Eq. (I.35) in Eq. (I-24) along with the second of Eqs. (I.25), we find $$E^>(r) = \Delta(k) \int F(r-r') \cdot p^>(r') dr' - \frac{4\pi}{3\epsilon} P^>(r) - \quad (I.38)$$

$$\int N(k; r-r') \cdot p^>(r') dr',$$

where $$N(k;r) \equiv -\epsilon^{-1} K(k;r) - \omega^2 U I(k;r). \quad (I.39)$$

Finally using Eqs. (I.18) and (I.35) in Eq. (I.39) we can write $$N(k;r) = N^{(1)}(k;r) + N^{(2)}(k;r), \quad (I.40)$$

where $$N^{(1)}(k;r) = -$$

$$\epsilon^{-1} U\left[\frac{k^2 n_o'(kr)\Delta_1(k;r)}{r} + \frac{4\pi}{3}\Delta(r) + k^3 n_o(kr)\Delta_1(k;r)\right] +$$

$$\epsilon_{rr}^{-1}\left[\frac{k^2 n_o'(kr)\Delta_1(k;r)}{r} + 4\pi\Delta(r) - k^3 n_o''(kr)\Delta_1(k;r)\right]$$

$$N^{(2)}(k;r) = \quad (I.41)$$

$$\epsilon^{-1} U\left[\frac{k^2 j_o'(kr)\Delta_2(k;r)}{r} + k^3 j_o(kr)\Delta_2(k;r)\right] -$$

$$\epsilon_{rr}^{-1}\left[\frac{k^2 j_o'(kr)\Delta_2(k;r)}{r} - k^3 j_o''(kr)\Delta_2(k;r)\right].$$

We now return to Eq. (I.22) and consider the effect of taking the limit $\eta \to 0$. For certain fields this must be done with some care. For example, it is not true that $\vec{e}^<(\vec{r}) \to 0$ as $\eta \to 0$, because the field inside a polarized sphere centered at $\vec{r}$ will not vanish even as the radius of that sphere becomes vanishingly small. However, it is true that $\vec{E}^<(\vec{r}) \to 0$ as $\eta \to 0$, since the fraction due to the sphere of the volume over which $\vec{e}^<(\vec{r})$ is integrated to yield $\vec{E}^<(\vec{r})$ vanishes as $\eta \to 0$, and of course the field outside the small sphere of polarization, but due to it, vanishes as $\eta \to 0$; thus as $\eta \to 0$ we have $\vec{E}^>(\vec{r}) \to \vec{E}(\vec{r})$. We also have $\vec{P}^>(\vec{r}) \to \vec{P}(\vec{r})$ as $\eta \to 0$, and $$\lim_{\eta \to 0} \int F(r-r') \cdot p^>(r') dr' = e(r) + \frac{4\pi}{3\epsilon} p(r), \tag{I.42}$$

which follows from Eq. (I.4). So in the limit $\eta \to 0$ Eq. (I.38) yields $$E(r) + \frac{4\pi}{3\epsilon} P(r) = \Delta(k)\left[e(r) + \frac{4\pi}{3\epsilon} p(r)\right] - \int N^o(k;r-r') \cdot p(r') dr', \tag{I.43}$$

where, following the convention of Eqs. (I.7) and (I.8), we have put $$\begin{aligned} N^o(k;r) &= N(k;r), \quad r > \eta \\ &= 0, \quad r < \eta \end{aligned} \tag{I.44}$$

$\eta \to 0$ after evaluating the integral.

Now recall that in writing Eqs. (I.4), (I.7), and (I.11) we have neglected a homogeneous solution of Eqs. (I.1). Such a homogeneous solution $\vec{e}^o(\vec{r})$ satisfies $$[\nabla^2 + k^2] e^o(r) = 0. \tag{I.45}$$

(cf. Eq. I.9), and will lead to a contribution $\vec{E}^o(\vec{r})$, $$E^o(r) = \int \Delta(r-r') e^o(r') dr'. \tag{I.46}$$

to the macroscopic field. From Eq. (I.45) we see that $\vec{e}^o(\vec{r})$ will be a sum (or integral) of fields of the form $\exp(i k \vec{n} \cdot \vec{r})$, where n is an arbitrary unit vector; so from Eqs. (I.17) and (I.46) we see that $$E^o(r) = \Delta(k) e^o(r). \tag{I.47}$$

Thus, even if the total $\vec{E}(\vec{r})$ includes $\vec{E}^o(\vec{r})$, and the total $\vec{e}(\vec{r})$ includes $\vec{e}^o(\vec{r})$, Eq. (I.43) will still hold.

The result (I.43) of our manipulation is an exact result. It follows directly from the Maxwell Eqs. (I.1), the condition of outgoing radiation implicit in the solutions (I.4) and (I.11), and the fact that the averaging function $\Delta(\vec{r})$ has spherical symmetry, $\Delta(\vec{r}) = \Delta(r)$. We now approximate Eq. (I.43) using the assumption that the range R of $\Delta(r)$ satisfies $kR \ll 1$. Since $\Delta_1(k;r)$ and $\Delta_2(k;r)$ will also have a range on the order of R, $N(k;\vec{r})$ will as well (see Eqs. I.40 and I.41). We can recover an approximation for $\bar{N}(k;\vec{r})$ in the limit $kR \ll 1$ by expanding $j_0(kr) = (kr)^{-1} \sin(kr)$ and $n_0(kr) = -(kr)^{-1} \cos(kr)$ in powers of kr to obtain asymptotic series approximations for $\Delta_1(k;r)$ and then using those in Eq. (I.41). For $\Delta_1(k;r)$ we find $$\Delta_1(k;r) \sim \Delta_1(r) - \frac{1}{6} (kR)^2 \Delta_1^{II}(r) + \ldots, \tag{I.48}$$

where $$\Delta_1(r) = 4\pi \int_r^\infty (r')^2 \Delta(r') dr' \tag{I.49}$$

$$\Delta_1^{II}(r) = 4\pi \int_r^\infty (r')^2 \Delta(r') \left(\frac{r'}{R}\right)^2 dr',$$

and, putting $\Delta_3(k;r) \equiv kr \Delta_2(k;r)$, we find $$\Delta_3(k;r) \sim \Delta_3(r) - \frac{1}{6}(kR)^2 \Delta_3^{II}(r) + \tag{I.50}$$

where $$\Delta_3(r) = -4\pi \int_r^\infty (r')^2 \Delta(r') \left(\frac{r}{r'}\right) dr' \tag{I.51}$$

$$\Delta_3^{II}(r) = -4\pi \int_r^\infty (r')^2 \Delta(r') \left(\frac{r}{r'}\right)\left(\frac{r'}{R}\right)^2 dr'.$$

Using Eqs. (I.48) and (I.50) in Eqs. (I.41), and expanding the spherical Bessel functions and their derivatives for small kr, we find $$N^{(1)}(k;\vec{r}) \sim N^{(1)}(\vec{r}) + (kR)^2 N^{(1)II}(\vec{r}) + \tag{I.52}$$

where $$N^{(1)}(r) = \frac{3rr - U}{\epsilon r^3}\left[\Delta_1(r) + \frac{4\pi}{3} r^3 \Delta(r)\right] \tag{I.53}$$

$$N^{(1)II}(r) = \frac{rr}{\epsilon r^3}\left[\frac{1}{2}\left(\frac{r}{R}\right)^2 \Delta_1(r) - \frac{1}{2} \Delta_1^{II}(r)\right] + \frac{U}{\epsilon r^3}\left[\frac{1}{2}\left(\frac{r}{R}\right)^2 \Delta_1(r) + \frac{1}{6} \Delta_1^{II}(r)\right],$$

and $$N^{(2)}(k;r) \sim N^{(2)}(r) + (kR)^2 N^{(2)II}(r) + \ldots, \tag{I.54}$$

where $$N^{(2)}(r) = 0$$

$$N^{(2)II}(r) = \frac{U}{\epsilon r^3}\left[\frac{2}{3}\left(\frac{r}{R}\right)^2 \Delta_3^{II}(r)\right]. \tag{I.55}$$

We are interested only in the lowest order in kR, so we take $N(k;\vec{r}) \to N^{(1)}(\vec{r})$. Consistent with this we take (now assuming that $\Delta(\vec{r})$ is normalized to unity, (Eq. 2.10)), $\Delta(k) \to 1$. Our exact result (I.43) then simplifies to the approximate expression $$e(r) = E^c(r) - \frac{4\pi}{3\epsilon} p(r) + \int T^c(r \to r') \cdot p(r') dr', \tag{I.56}$$

where $$E^c(r) \equiv E(r) + \frac{4\pi}{3\epsilon} P(r) \tag{I.57}$$

is the "cavity field" that is introduced immediately in more heuristic derivations (see section 2), and $$T^c(r) = T^o(r) c(r), \tag{I.58}$$

where $$T^0(r) = \frac{3rr - U}{\epsilon r^3}, \quad r > \eta \quad (1.59)$$
$$= 0 \quad r < \eta$$

$\eta \to 0$ after evaluating the integral, is the static dipole-dipole coupling tensor in a background medium of dielectric constant $\epsilon$, cut off for $r < \eta$ at the origin, and $$c(r) = \Delta_1(r) + \frac{4\pi}{3} r^3 \Delta(r) \quad (1.60)$$

is a function that cuts off at large r, $c(0)=1$, $c(r) \to 0$, as $r \to \infty$, with a range on the order of R.

APPENDIX II

In this appendix we state some geometrical formulas that are useful in calculating the nonlinear response of the host material in the neighborhood of an inclusion (see section 6). Defining $$r = xx + yy + zz$$
$$n \equiv r/r = x \sin\theta \cos\phi + y \sin\theta \sin\phi + z \cos\theta, \quad (II.1)$$

where $r = |\vec{r}|$ and $(\theta, \phi)$ are the usual angular spherical coordinates, we denote the Cartesian components of n by $n_i$:

$$n_1 = \sin\theta \cos\phi$$
$$n_2 = \sin\theta \sin\phi$$
$$n_3 = \cos\theta. \quad (II.2)$$

For any quantity $q = q(\theta, \phi)$, we define $$\overline{q} \equiv \frac{1}{4\pi} \int q(\theta,\phi) d\Omega, \quad (II.3)$$

where $d\Omega = \sin\theta d\theta d\phi$ is an element of solid angle. It is then easy to verify that $$\overline{n_i} = 0$$
$$\overline{n_i n_j} = \tfrac{1}{3}\delta_{ij}$$
$$\overline{n_i n_j n_k} = 0$$
$$\overline{n_i n_j n_k n_l} = \frac{1}{15}(\delta_{ij}\delta_{kl} + \delta_{ik}\delta_{jl} + \delta_{il}\delta_{jk}). \quad (II.4)$$

where $\delta_{ij}$ is the Kronecker delta ($\delta_{ij}=1$ if $i=j$, $\delta_{ij}=0$ otherwise). All of the results of this appendix are based on Eqs. (II.4). For example, putting (cf. Eq. 6.6)

$$t_{ij} \equiv 3n_i n_j - \delta_{ij}$$
$$s_{ij} \equiv t_{ik}t_{kj} = 3n_i n_j + \delta_{ij}. \quad (II.5)$$

where throughout this appendix repeated indices are summed over, we easily find $$\overline{t_{ij}} = 0 \quad (II.6)$$
$$\overline{s_{ij}} = 2\delta_{ij}$$
$$\overline{t_{ml}t_{jk}} = \overline{t_{ml}s_{jk}}$$
$$= \tfrac{3}{5}(\delta_{mj}\delta_{lk} + \delta_{mk}\delta_{lj}) - \tfrac{2}{5}\delta_{ml}\delta_{jk}$$
$$\overline{s_{ml}s_{jk}} = \tfrac{18}{5}\delta_{ml}\delta_{jk} + \tfrac{3}{5}(\delta_{mj}\delta_{lk} + \delta_{mk}\delta_{lj}),$$

which are used in deriving the results below.

We first define some auxiliary quantities that are useful in intermediate steps of the calculations:

$$C^{\alpha\beta\gamma}_{mljk} \equiv (\delta_{ml} + \sigma^\alpha t_{ml})(\delta_{ij} + \sigma^\beta t_{ij})(\delta_{ik} + \sigma^\gamma t_{ik}),$$
$$\sigma^\alpha \equiv r^{-3} a^3 \alpha, \quad (II.7)$$

where the Greek indices label a set of parameters $\alpha$ that are independent of r, $\theta$, and $\phi$; a is also a constant. Further, we define $$A^{\alpha\beta\gamma}_{pljk} = r^{-3} t_{pm} C^{\alpha\beta\gamma}_{mljk}$$
$$F^{\alpha\beta\gamma}_{mljk} = C^{\alpha\beta\gamma}_{mljk} - \delta_{ml}\delta_{jk}. \quad (II.8)$$

We can then easily determine that $$\int_a^\infty r^2 \overline{A^{\alpha\beta\gamma}_{pljk}} \, dr = \quad (II.9)$$

$$\delta_{pl}\delta_{jk}\left[\tfrac{2}{3}\alpha - \tfrac{2}{15}(\beta + \gamma) - \tfrac{1}{15}(\alpha\beta + \alpha\gamma + \beta\gamma) + \tfrac{2}{5}\alpha\beta\gamma\right] + (\delta_{pj}\delta_{lk} + \delta_{pk}\delta_{lj})\left[\tfrac{1}{5}(\beta + \gamma) + \tfrac{1}{10}(\alpha\beta + \alpha\gamma + \beta\gamma) + \tfrac{1}{15}\alpha\beta\gamma\right],$$

and $$\int_a^\infty r^2 \overline{F^{\alpha\beta\gamma}_{mljk}} \, dr = \quad (II.10)$$

$$\tfrac{1}{3} a^3 \delta_{ml}\delta_{jk}\left[2\beta\gamma - \tfrac{2}{5}(\alpha\beta + \alpha\gamma) - \tfrac{1}{5}\alpha\beta\gamma\right] + \tfrac{1}{3} a^3 (\delta_{mj}\delta_{lk} + \delta_{mk}\delta_{lj})\left[\tfrac{3}{5}(\alpha\beta + \alpha\gamma) + \tfrac{3}{10}\alpha\beta\gamma\right].$$

Now our quantities of interest are $$B^{\alpha\beta\gamma}_{pljk} \equiv \frac{1}{4\pi} A^{\alpha\beta\gamma}_{pljk} \theta(r - a) \quad (II.11)$$
$$D^{\alpha\beta\gamma}_{mljk} \equiv -\delta_{ml}\delta_{jk} + C^{\alpha\beta\gamma}_{mljk} \theta(r - a)$$
$$= -\delta_{ml}\delta_{jk} \theta(a - r) + F^{\alpha\beta\gamma}_{mljk} \theta(r - a),$$

where $\theta(x) = 0, 1$ for $x < 0$, $x > 0$ respectively. In particular, we seek $$\int \overline{B^{\alpha\beta\gamma}_{pljk}} \, dr = \int_a^\infty r^2 \overline{A^{\alpha\beta\gamma}_{mljk}} \, dr \quad (II.12)$$

-continued $$\int D_{mljk}^{\alpha\beta\gamma} dr = -\frac{4\pi}{3} a^3 \delta_m \delta_{jk} + 4\pi \int_a^\infty r^2 F_{mljk}^{\alpha\beta\gamma} dr,$$

where as usual $d\vec{r}=r^2 dr d\Omega$. Using the results (II.9 and II.10), the integrals of B and D in Eq. (II.12) can be easily found. We require two particular cases for the choices of $\alpha$, $\beta$, $\gamma$. In the first we want $\alpha=\beta$, $\gamma=\beta^*$; these terms we denote by $B^{\beta\beta\beta^*}{}_{pljk}$ and $D^{\beta\beta\beta^*}{}_{mljk}$. In the second we want $\gamma=\beta$, $\alpha=\beta^*$; these terms we denote by $B^{\beta^*\beta\beta}{}_{pljk}$ and $D^{\beta^*\beta\beta}{}_{mljk}$. Collecting contributions, we find $$\int B_{pljk}^{\beta\beta\beta^*} dr = \delta_p \delta_{jk} \left[ \frac{2}{3} \beta - \frac{2}{15} (\beta + \beta^*) - \frac{1}{15} (\beta^2 + 2|\beta|^2) + \frac{2}{5} \beta|\beta|^2 \right] + (\delta_{pj}\delta_{lk} + \delta_{pk}\delta_{lj}) \left[ \frac{1}{5} (\beta + \beta^*) + \frac{1}{10} (\beta^2 + 2|\beta|^2) + \frac{1}{15} \beta|\beta|^2 \right]$$

(II.13)

$$\int B_{pljk}^{\beta^*\beta\beta} dr = \delta_p \delta_{jk} \left[ \frac{2}{3} \beta^* - \frac{4}{15} \beta - \frac{1}{15} (\beta^2 + 2|\beta|^2) + \frac{2}{5} \beta|\beta|^2 \right] + (\delta_{pj}\delta_{lk} + \delta_{pk}\delta_{lj}) \left[ \frac{2}{5} \beta + \frac{1}{10} (\beta^2 + 2|\beta|^2) + \frac{1}{15} \beta|\beta|^2 \right],$$

and $$\int D_{mljk}^{\beta\beta\beta^*} dr =$$

$$\frac{4\pi}{3} a^3 \delta_m \delta_{jk} \left[ -1 + 2|\beta|^2 - \frac{2}{5}(\beta^2 + |\beta|^2) - \frac{1}{5} \beta|\beta|^2 \right] +$$

$$\frac{4\pi}{3} a^3 (\delta_{mj}\delta_{lk} + \delta_{mk}\delta_{lj}) \left[ \frac{3}{5}(\beta^2 + |\beta|^2) + \frac{3}{10} \beta|\beta|^2 \right]$$

$$\int D_{mljk}^{\beta^*\beta\beta} dr = \qquad (II.14)$$

$$\frac{4\pi}{3} a^3 \delta_m \delta_{jk} \left[ -1 + 2\beta^2 - \frac{4}{5} |\beta|^2 - \frac{1}{5} \beta|\beta|^2 \right] +$$

$$\frac{4\pi}{3} a^3 (\delta_{mj}\delta_{lk} + \delta_{mk}\delta_{lj}) \left[ \frac{6}{5} |\beta|^2 + \frac{3}{10} \beta|\beta|^2 \right].$$

We claim:

1. A system for processing optical radiation to provide nonlinear response which is a function of the intensity of said radiation which comprises a body of composite material having a host material component and an inclusion material component, at least said host having an optical response which varies nonlinearly with the amplitude of an optical field applied to said body, and means for applying an optical field to said body of sufficient intensity to induce said nonlinear response, said nonlinear response of said body to said field being defined by a nonlinear susceptibility greater than the susceptibility of either of said components thereof.

2. The system according to claim 1 wherein said inclusion material also possesses nonlinear optical susceptibility.

3. The system according to claim 1 wherein said inclusion material possesses substantially only linear optical susceptibility.

4. The system according to claim 1 wherein said inclusions are particles having maximum dimension less than a wavelength of said optical radiation.

5. The system according to claim 4 wherein said particles are generally spherical.

6. The system according to claim 4 wherein the distance between those of said particles which are adjacent each other is less than a wavelength.

7. The system according to claim 1 wherein said host and inclusion components are both optically isotropic.

8. The system according to claim 7 wherein said body is macroscopically isotropic.

9. The system according to claim 1 wherein said susceptibility is the third order nonlinear susceptibility.

10. The system according to claim 2 wherein said host and inclusion components both possess third order nonlinear susceptibility.

11. The system according to claim 1 wherein said host and said inclusion components are nonabsorptive of said optical radiation.

12. The system according to claim 1 wherein said host and inclusion components both transmissive of said optical radiation.

13. The system according to claim 1 wherein said body is in the path of said radiation, said radiation is a beam of optical energy and said body provides means responsive to said beam for generating optical radiation at a harmonic of the frequency of said beam.

14. The system according to claim 13 wherein said harmonic is the second harmonic.

15. The system according to claim 13 wherein said harmonic is the third harmonic.

16. The system according to claim 1 wherein means are provided for applying to said body said radiation from a plurality of laser beams each of a different frequency to produce radiation which is equal to the sum and difference of said different frequencies upon mixing interactions of said radiation of said beams in said body.

17. The system according to claim 1 wherein said applying means applies said radiation as a beam of laser light of sufficient intensity to change the refractive index of said body as a function of the intensity of said beam.

18. The system according to claim 17 wherein said body defines a lens which focuses said radiation.

19. The system according to claim 1 wherein said body is disposed in a resonant cavity and said radiation is applied to said body to induce output radiation by parametric oscillation at a frequency different from the frequency of said applied radiation.

20. The system according to claim 1 wherein said inclusions are distributed homogenously in said host.

21. The system according to claim 1 wherein said host material is homogenous and said inclusions are particles of size less than the wavelength of said radiation distributed generally uniformly in said body with a fill fraction (fraction of volume of said body containing said inclusions) up to 1.0.

22. The system according to claim 1 wherein said inclusion component comprises particles about 50 Angstroms in maximum dimension.

23. The system according to claim 22 wherein said particles are a materials selected from the group consisting of titania, diamond, semiconductive microcrystallites and said host is a material selected from the group consisting of carbon disulfide, polymers and porous glass filled with material possessing nonlinear susceptibility.

24. The system according to claim 23 wherein said polymer is polydiacetylene.

25. The system according to claim 23 wherein said semiconductive microcrystallites are cadmium sulfide material.

26. The system according to claim 1 wherein the ratio of the optical field dielectric constants of the inclusion component to the host component is greater than one, and the refractive indices of said components substantially differ.

27. The method for processing optical radiation to provide nonlinear response which is a function of the intensity of said radiation which comprises propagating said radiation into a body of composite material having a host material component and an inclusion material component, at least said host having an optical response which varies nonlinearly with the amplitude of an optical field applied to said body due to said radiation, and said field having sufficient intensity to induce said nonlinear response, said nonlinear response of said body to said field being defined by a nonlinear susceptibility greater than the susceptibility of either of said components thereof.

28. The method according to claim 27 wherein said inclusion material also possesses nonlinear optical susceptibility.

29. The method according to claim 27 wherein said inclusion material possesses substantially only linear optical susceptibility.

30. The method according to claim 27 wherein said inclusions are particles having maximum dimension less than a wavelength of said optical radiation.

31. The method according to claim 30 wherein said particles are generally spherical.

32. The method according to claim 30 wherein the distance between those of said particles which are adjacent each other is less than a wavelength.

33. The method according to claim 27 wherein said host and inclusion components are both optically isotropic.

34. The method according to claim 33 wherein said body is macroscopically isotropic.

35. The method according to claim 27 wherein said susceptibility is the third order nonlinear susceptibility.

36. The method according to claim 28 wherein said host and inclusion components both possess third order nonlinear susceptibility.

37. The method according to claim 27 wherein said host and said inclusion components are nonabsorptive of said optical radiation.

38. The method according to claim 27 wherein said host and inclusion components both transmissive of said optical radiation.

39. The method according to claim 27 wherein said propagating step is carried out with body in the path of said radiation, said radiation is a beam of optical energy, and generating optical radiation at a harmonic of the frequency of said beam in response to said beam.

40. The method according to claim 39 wherein said harmonic is the second harmonic.

41. The method according to claim 39 wherein said harmonic is the third harmonic.

42. The method according to claim 27 wherein said propagating step is carried out by generating said radiation from a plurality of laser beams each of a different frequency, and producing output radiation which is equal to the sum and difference of said different frequencies upon mixing interactions of said radiation of said beams in said body.

43. The method according to claim 27 wherein said propagating step is carried out by applying said radiation to said body as a beam of laser light of sufficient intensity to change the refractive index of said body as a function of the intensity of said beam.

44. The method according to claim 43 further comprising forming a lens which focuses said radiation due to the change of the refractive index of said body.

45. The method according to claim 27, further comprising the step of locating said body in a resonant cavity, and generating output radiation by parametric oscillation at a frequency different from the frequency of said applied radiation propagated in said body.

46. The method according to claim 27 wherein said inclusions are distributed homogenously in said host.

47. The method according to claim 27 wherein said host material is homogenous and said inclusions are particles of size less than the wavelength of said radiation distributed generally uniformly in said body with a fill fraction (fraction of volume of said body containing said inclusions) up to 1.0.

48. The method according to claim 27 wherein said inclusions are particles about 50 angstroms in maximum dimension.

49. The method according to claim 48 wherein said particles are a materials selected from the group consisting of titania, diamond, semiconductive microcrystallites and said host is a material selected from the group consisting of carbon disulfide, polymers and porous glass filled with material possessing nonlinear susceptibility.

50. The method according to claim 49 wherein said polymer is polydiacetylene.

51. The method according to claim 49 wherein said semiconductive microcrystallites are cadmium sulfide material.

52. The method according to claim 27 wherein the ratio of the optical field dielectric constants of the inclusion component to the host component is greater than one, and their refractive indices are substantially different.

53. A device for processing optical radiation which provides a nonlinear response which is a function of the intensity of said radiation which comprises a body of composite material having a host material component and an inclusion material component, at least said host having an optical response which varies nonlinearly with the amplitude of an optical field applied to said body of sufficient intensity to induce said nonlinear response, said nonlinear response of said body to said field being defined by a nonlinear susceptibility greater than the susceptibility of either of said components thereof.

54. The device according to claim 53 wherein said inclusion material also possesses nonlinear optical susceptibility.

55. The device according to claim 53 wherein said inclusion material possesses substantially only linear optical susceptibility.

56. The device according to claim 53 wherein said inclusions are particles having maximum dimension less than a wavelength of said optical radiation.

57. The device according to claim 56 wherein said particles are generally spherical.

58. The device according to claim 56 wherein the distance between those of said particles which are adjacent each other is less than a wavelength.

59. The device according to claim 53 wherein said host and inclusion components are both optically isotropic.

60. The device according to claim 59 wherein said body is macroscopically isotropic.

61. The device according to claim 53 wherein said susceptibility is the third order nonlinear susceptibility.

62. The device according to claim 54 wherein said host and inclusion components both possess third order nonlinear susceptibility.

63. The device according to claim 53 wherein said host and said inclusion components are nonabsorptive of said optical radiation.

64. The device according to claim 53 wherein said host and inclusion components both are transmissive of said optical radiation.

65. The device according to claim 53 wherein said body is in the path of said radiation, said radiation is a beam of optical energy and said body provides means responsive to said beam for generating optical radiation at a harmonic of the frequency of said beam.

66. The device according to claim 65 wherein said harmonic is the second harmonic.

67. The device according to claim 65 wherein said harmonic is the third harmonic.

68. The device according to claim 53 wherein radiation is provided by a plurality of laser beams each of a different frequency to produce radiation which is equal to the sum and difference of said different frequencies upon mixing interactions of said radiation of said beams in said body.

69. The device according to claim 53 wherein said radiation is a beam of laser light of sufficient intensity to change the refractive index of said body as a function of the intensity of said beam.

70. The device according to claim 69 wherein said body defines a lens which focuses said radiation.

71. The device according to claim 53 wherein said body is disposed in a resonant cavity and said radiation is applied to said body to induce output radiation by parametric oscillation at a frequency different from the frequency of said applied radiation.

72. The device according to claim 53 wherein said inclusions are distributed homogenously in said host.

73. The device according to claim 53 wherein said host material is homogenous and said inclusions are particles of size less than the wavelength of said radiation distributed generally uniformly in said body with a fill fraction (fraction of volume of said body containing said inclusions) up to 1.0.

74. The device according to claim 53 wherein said inclusion component comprises particles about 50 Angstroms in maximum dimension.

75. The device according to claim 73 wherein said particles are a materials selected from the group consisting of titania, diamond, semiconductive microcrystallites and said host is a material selected from the group consisting of carbon disulfide, polymers and porous glass filled with material possessing nonlinear susceptibility.

76. The device according to claim 75 wherein said polymer is polydiacetylene.

77. The device according to claim 75 wherein said semiconductive microcrystallites are cadmium sulfide material.

78. The device according to claim 53 wherein the ratio of the optical field dielectric constants of the inclusion component to the host component is greater than one, and the refractive indices of said components differ by about one.

* * * * *